US009445488B2

(12) United States Patent
Foret

(10) Patent No.: US 9,445,488 B2
(45) Date of Patent: Sep. 13, 2016

(54) PLASMA WHIRL REACTOR APPARATUS AND METHODS OF USE

(71) Applicant: Foret Plasma Labs, LLC, The Woodlands, TX (US)

(72) Inventor: Todd Foret, The Woodlands, TX (US)

(73) Assignee: Foret Plasma Labs, LLC, The Woodlands, TX (US)

(*) Notice: Subject to any disclaimer, the term of this patent is extended or adjusted under 35 U.S.C. 154(b) by 592 days.

(21) Appl. No.: 14/217,207

(22) Filed: Mar. 17, 2014

(65) Prior Publication Data

US 2015/0041454 A1 Feb. 12, 2015

Related U.S. Application Data

(63) Continuation-in-part of application No. 13/633,128, filed on Oct. 1, 2012, now Pat. No. 8,810,122, which is a continuation-in-part of application No. 12/371,575, filed on Feb. 13, 2009, now Pat. No. 8,278,810, which is a continuation-in-part of application No. 12/288,170, filed on Oct. 16, 2008, now Pat. No. 9,051,820, (Continued)

(30) Foreign Application Priority Data

Oct. 1, 2013 (WO) ................ PCT/US2013/062941

(51) Int. Cl.
*H01J 17/26* (2012.01)
*H05H 1/40* (2006.01)
(Continued)

(52) U.S. Cl.
CPC ................ *H05H 1/40* (2013.01); *B23K 10/00* (2013.01); *B23K 10/006* (2013.01); *B23K 10/02* (2013.01);
(Continued)

(58) Field of Classification Search
CPC .. H05H 1/34; H05H 2001/3431; H05H 1/42; H05H 1/48
USPC ........................................ 313/231.41, 231.31
See application file for complete search history.

(56) References Cited

U.S. PATENT DOCUMENTS

| 481,979 A | 9/1892 | Stanley |
| 501,732 A | 7/1893 | Roeske |

(Continued)

FOREIGN PATENT DOCUMENTS

| JP | 2006-501980 A | 1/2006 |
| KR | 101999009569 A | 2/1999 |
| KR | 10-2004-0005107 A | 1/2004 |
| WO | 2007117634 A2 | 10/2007 |

OTHER PUBLICATIONS

Belani, A., "It's Time for an Industry Initiative on Heavy Oil," JPT Online accessed on Oct. 16, 2007 at http://www.spe.org/spe-app/spe/jpt/2006/06/mangement_heavy_oil.htm.

(Continued)

*Primary Examiner* — Vip Patel
(74) *Attorney, Agent, or Firm* — Daniel J. Chalker; Edwin S. Flores; Chalker Flores, LLP

(57) ABSTRACT

A plasma system includes a plasma arc torch, a cylindrical tube and an eductor. The plasma arc torch includes a cylindrical vessel having a first end and a second end, a first tangential inlet/outlet connected to or proximate to the first end, a second tangential inlet/outlet connected to or proximate to the second end, an electrode housing connected to the first end such that a first electrode is (a) aligned with a longitudinal axis of the cylindrical vessel, and (b) extends into the cylindrical vessel, and a hollow electrode nozzle connected to the second end of the cylindrical vessel. The cylindrical tube is attached to the hollow electrode nozzle and aligned with the longitudinal axis, the cylindrical tube having a side inlet and a radio frequency coil disposed around or embedded within the cylindrical tube. The eductor is attached to the cylindrical tube and aligned with the longitudinal axis.

12 Claims, 29 Drawing Sheets

Related U.S. Application Data which is a continuation-in-part of application No. 12/370,591, filed on Feb. 12, 2009, now Pat. No. 8,074,439.

(60) Provisional application No. 61/787,682, filed on Mar. 15, 2013, provisional application No. 61/788,244, filed on Mar. 15, 2013, provisional application No. 60/980,443, filed on Oct. 16, 2007, provisional application No. 61/027,879, filed on Feb. 12, 2008, provisional application No. 61/028,386, filed on Feb. 13, 2008.

(51) Int. Cl.
| | |
|---|---|
| H05H 1/44 | (2006.01) |
| B23K 10/00 | (2006.01) |
| H05H 1/34 | (2006.01) |
| B23K 10/02 | (2006.01) |
| B23K 15/00 | (2006.01) |
| B23K 15/06 | (2006.01) |
| B23K 15/08 | (2006.01) |
| H05H 1/48 | (2006.01) |
| H05H 1/30 | (2006.01) |
| F02K 3/08 | (2006.01) |

(52) U.S. Cl.
CPC ........... *B23K 15/0046* (2013.01); *B23K 15/06* (2013.01); *B23K 15/08* (2013.01); *F02K 3/08* (2013.01); *H05H 1/30* (2013.01); *H05H 1/34* (2013.01); *H05H 1/44* (2013.01); *H05H 1/48* (2013.01); *H01J 2237/31* (2013.01); *H05H 2001/3431* (2013.01); *H05H 2001/3484* (2013.01)

(56) References Cited

U.S. PATENT DOCUMENTS

| | | |
|---|---|---|
| 2,784,294 A | 3/1957 | Gravert |
| 2,898,441 A | 8/1959 | Reed et al. |
| 2,923,809 A | 2/1960 | Clews et al. |
| 3,004,189 A | 10/1961 | Giannini |
| 3,082,314 A | 3/1963 | Arata et al. |
| 3,131,288 A | 4/1964 | Browning et al. |
| 3,242,305 A | 3/1966 | Kane et al. |
| 3,522,846 A | 8/1970 | New |
| 3,534,388 A | 10/1970 | Ito et al. |
| 3,567,898 A | 3/1971 | Fein |
| 3,619,549 A | 11/1971 | Hogan et al. |
| 3,641,308 A | 2/1972 | Couch, Jr. et al. |
| 3,787,247 A | 1/1974 | Couch, Jr. |
| 3,798,784 A | 3/1974 | Kovats et al. |
| 3,830,428 A | 8/1974 | Dyos |
| 3,833,787 A | 9/1974 | Couch, Jr. |
| 4,067,390 A | 1/1978 | Camacho et al. |
| 4,169,503 A | 10/1979 | Scott |
| 4,203,022 A | 5/1980 | Couch, Jr. et al. |
| 4,265,747 A | 5/1981 | Copa et al. |
| 4,311,897 A | 1/1982 | Yerushalmy |
| 4,344,839 A | 8/1982 | Pachkowski et al. |
| 4,463,245 A | 7/1984 | McNeil |
| 4,531,043 A | 7/1985 | Zverina et al. |
| 4,567,346 A | 1/1986 | Marhic |
| 4,624,765 A | 11/1986 | Cerkanowicz et al. |
| 4,685,963 A | 8/1987 | Saville et al. |
| 4,776,638 A | 10/1988 | Hahn |
| 4,791,268 A | 12/1988 | Sanders et al. |
| 4,886,118 A | 12/1989 | Van Meurs et al. |
| 5,019,268 A | 5/1991 | Rogalla |
| 5,048,404 A | 9/1991 | Bushnell et al. |
| 5,082,054 A | 1/1992 | Kiamanesh |
| 5,132,512 A | 7/1992 | Sanders et al. |
| 5,166,950 A | 11/1992 | Jouvaud et al. |
| 5,326,530 A | 7/1994 | Bridges |
| 5,348,629 A | 9/1994 | Khudenko |
| 5,368,724 A | 11/1994 | Ayres et al. |
| 5,534,232 A | 7/1996 | Denes et al. |
| 5,609,736 A | 3/1997 | Yamamoto |
| 5,609,777 A | 3/1997 | Apunevich et al. |
| 5,655,210 A | 8/1997 | Gregoire et al. |
| 5,660,743 A | 8/1997 | Nemchinsky |
| 5,738,170 A | 4/1998 | Lavernhe |
| 5,746,984 A | 5/1998 | Hoard |
| 5,760,363 A | 6/1998 | Hackett et al. |
| 5,766,447 A | 6/1998 | Creijghton |
| 5,876,663 A | 3/1999 | Laroussi |
| 5,879,555 A | 3/1999 | Khudenko |
| 5,893,979 A | 4/1999 | Held |
| 5,908,539 A | 6/1999 | Young et al. |
| 5,979,551 A | 11/1999 | Uban et al. |
| 6,007,681 A | 12/1999 | Kawamura et al. |
| 6,117,401 A | 9/2000 | Juvan |
| 6,228,266 B1 | 5/2001 | Shim |
| 6,514,469 B1 | 2/2003 | Kado et al. |
| 6,749,759 B2 | 6/2004 | Denes et al. |
| 6,929,067 B2 | 8/2005 | Vinegar et al. |
| 6,942,786 B1 | 9/2005 | Fosseng |
| 6,987,792 B2 | 1/2006 | Do et al. |
| 7,081,171 B1 | 7/2006 | Sabol et al. |
| 7,086,468 B2 | 8/2006 | De Rouffignac et al. |
| 7,096,953 B2 | 8/2006 | De Rouffignac et al. |
| 7,121,342 B2 | 10/2006 | Vinegar et al. |
| 7,128,816 B2 | 10/2006 | Denes et al. |
| 7,422,695 B2 | 9/2008 | Foret |
| 7,536,975 B2 | 5/2009 | Denes et al. |
| 7,857,972 B2 | 12/2010 | Foret |
| 7,893,408 B2 | 2/2011 | Hieftje et al. |
| 8,074,439 B2 | 12/2011 | Foret |
| 8,278,810 B2 | 10/2012 | Foret |
| 8,568,663 B2 | 10/2013 | Foret |
| 8,810,122 B2 | 8/2014 | Foret |
| 8,833,054 B2 | 9/2014 | Foret |
| 8,904,749 B2 | 12/2014 | Foret |
| 9,051,820 B2 | 6/2015 | Foret |
| 2002/0148562 A1 | 10/2002 | Aoyagi et al. |
| 2003/0024806 A1 | 2/2003 | Foret |
| 2003/0101936 A1 | 6/2003 | Lee |
| 2003/0150325 A1 | 8/2003 | Hyppanen |
| 2003/0179536 A1 | 9/2003 | Stevenson et al. |
| 2003/0213604 A1 | 11/2003 | Stevenson et al. |
| 2005/0087435 A1 | 4/2005 | Kong et al. |
| 2005/0151455 A1 | 7/2005 | Sato et al. |
| 2005/0155373 A1 | 7/2005 | Hirooka et al. |
| 2006/0104849 A1 | 5/2006 | Tada et al. |
| 2006/0151445 A1 | 7/2006 | Schneider |
| 2006/0196424 A1 | 9/2006 | Swallow et al. |
| 2007/0104610 A1 | 5/2007 | Houston et al. |
| 2007/0240975 A1 | 10/2007 | Foret |
| 2007/0253874 A1 | 11/2007 | Foret |
| 2008/0058228 A1 | 3/2008 | Wilson |
| 2008/0202915 A1 | 8/2008 | Hieftje et al. |
| 2009/0118145 A1 | 5/2009 | Wilson et al. |
| 2009/0200032 A1 | 8/2009 | Foret |
| 2009/0235637 A1 | 9/2009 | Foret |
| 2009/0277774 A1 | 11/2009 | Foret |
| 2010/0212498 A1 | 8/2010 | Salazar |
| 2011/0005999 A1 | 1/2011 | Randal |
| 2011/0022043 A1 | 1/2011 | Wandke et al. |
| 2011/0031224 A1 | 2/2011 | Severance, Jr. et al. |
| 2011/0225948 A1 | 9/2011 | Valeev et al. |
| 2012/0097648 A1 | 4/2012 | Foret |
| 2012/0227968 A1 | 9/2012 | Eldred et al. |
| 2013/0020926 A1 | 1/2013 | Foret |

OTHER PUBLICATIONS

"Brandt, A. R., "Converting Green River oil shale to liquid fuels with Alberta Taciuk Processor: energy inputs andgreenhouse gas emissions," Jun. 1, 2007".

Brandt, A. R., "Converting Green River oil shale to liquid fuels with the Shell in-situ conversion process: energy inputs and greenhouse gas emissions," Jun. 30, 2007.

(56) References Cited

OTHER PUBLICATIONS

Kavan, L., "Electrochemical Carbon," Chem Rev (1997), 97:3061-3082.
Understanding in-situ combustion, www.HeavyOilinfo.com, accessed Oct. 16, 2007.
Unleashing the potential: Heavy Oil, Supplement to E&P. Annual Reference Guide, www.eandp.info.com, Jun. 2007.
International Search Report [KIPO] PCT/US201/062941 dated Jan. 27, 2014.
International Search Report and Written Opinion for PCT/US2008/011926 dated Apr. 27, 2009.
International Search Report and Written Opinion for PCT/US2009/000937 dated Sep. 17, 2009.
PCT/US2014/2014/024991 [KIPO] International Search Report dated Aug. 6, 2014.
PCT/US2014/030090 [KIPO] International Search Report dated Sep. 25, 2014.

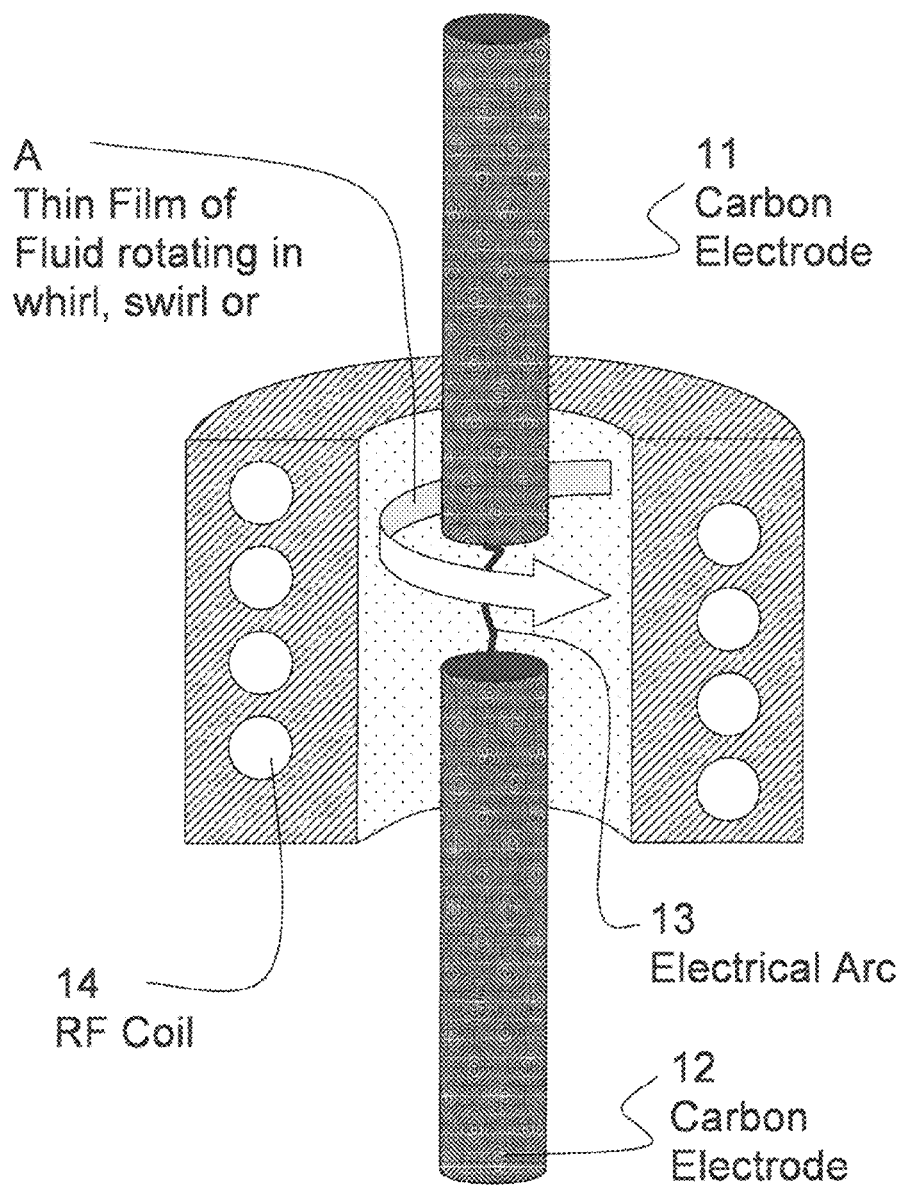
Fig. 1 – Inductively Coupled Plama Carbon ArcWhirl®

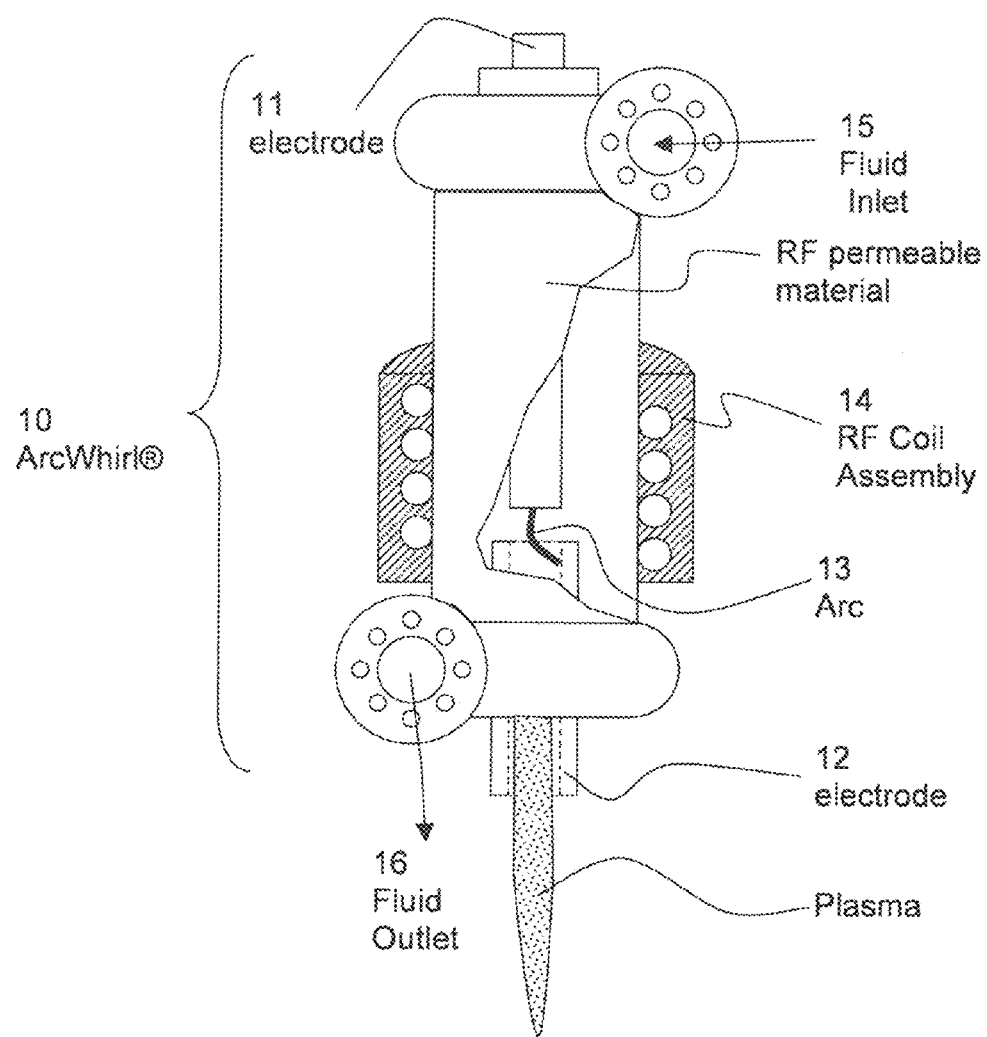
Fig. 2 – Inductively Coupled Plasma ArcWhirl® Torch

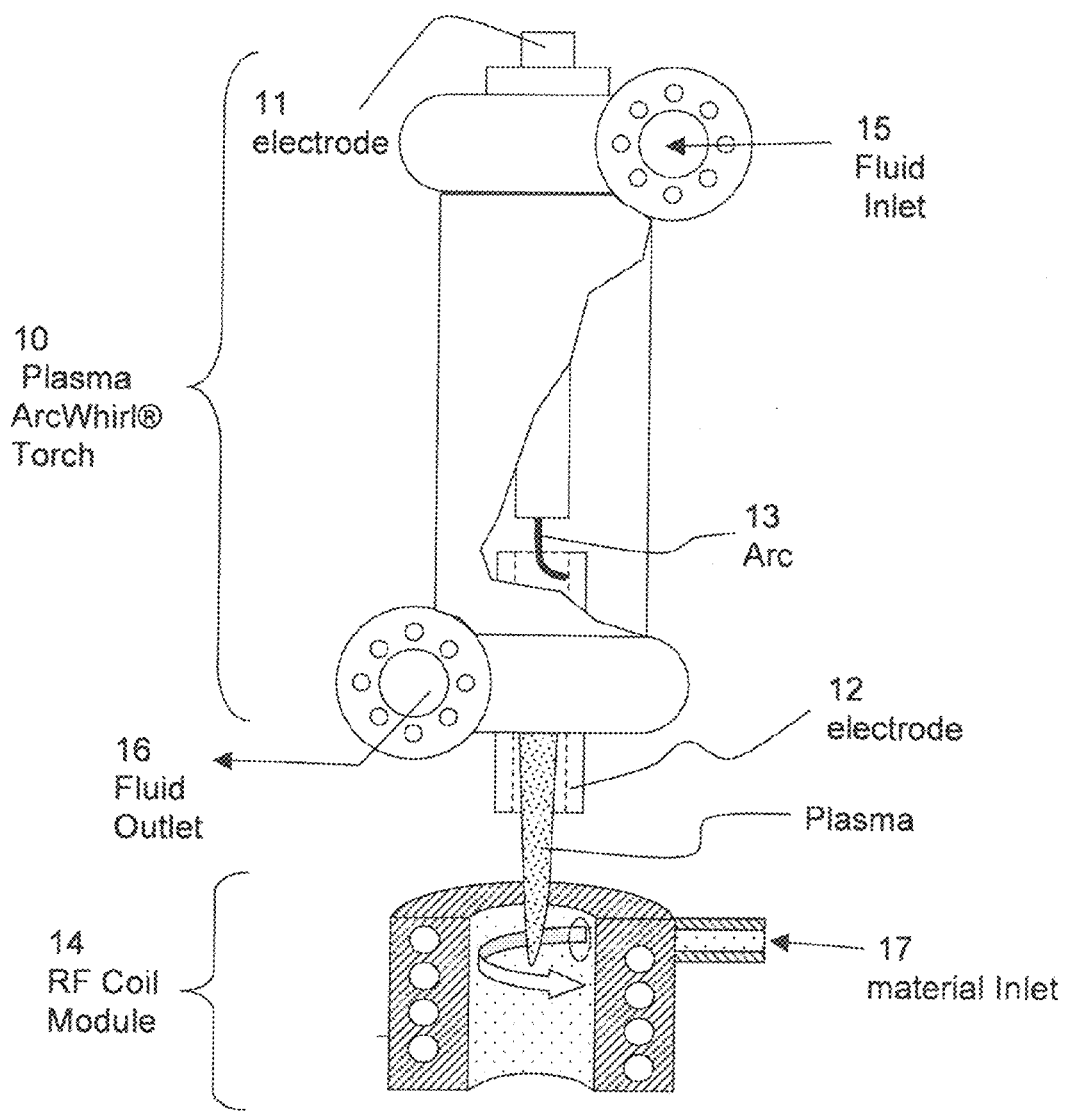
Fig. 3 – ICP ArcWhirl® Reactor Modules

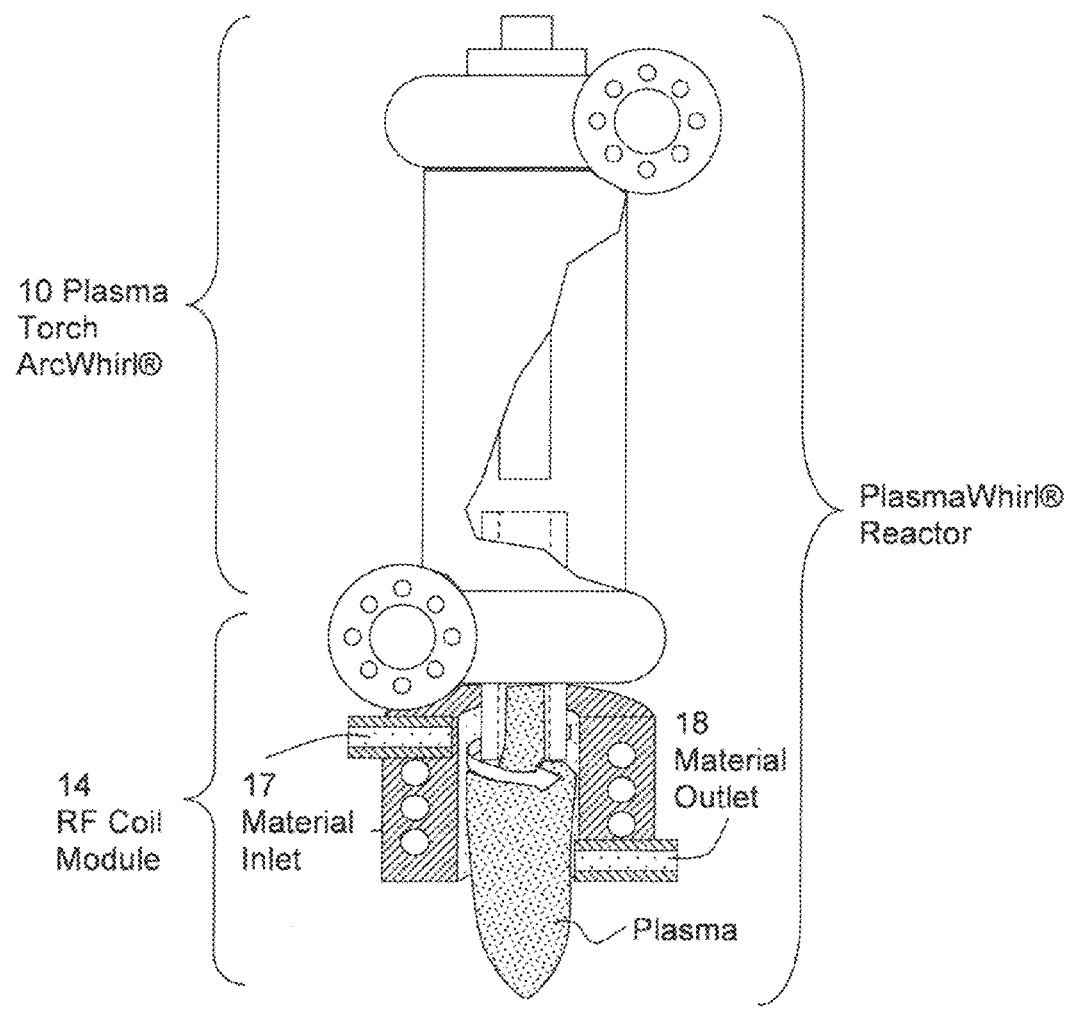
Fig. 4 — ICP ArcWhirl® Reactor

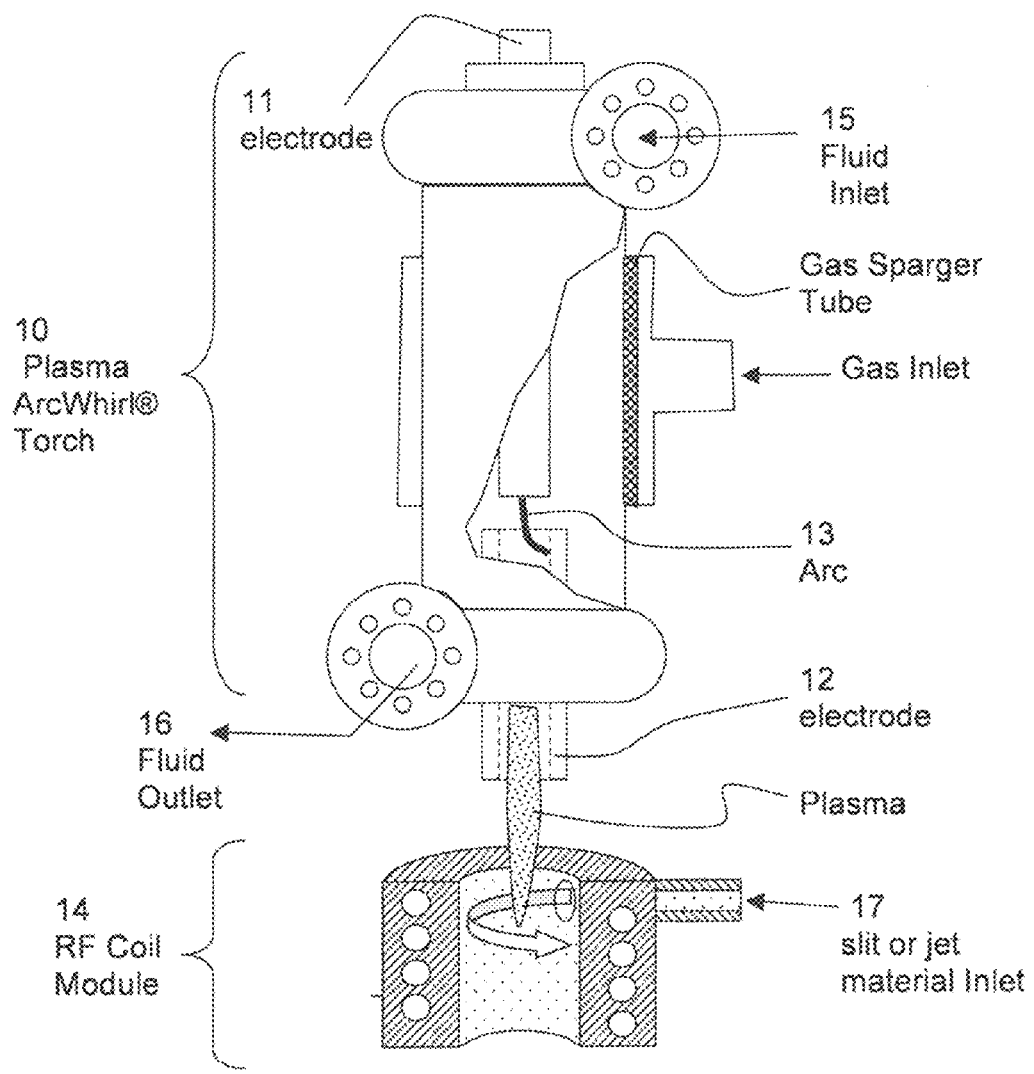
Fig. 5 – ICP ArcWhirl® Gas Sparger

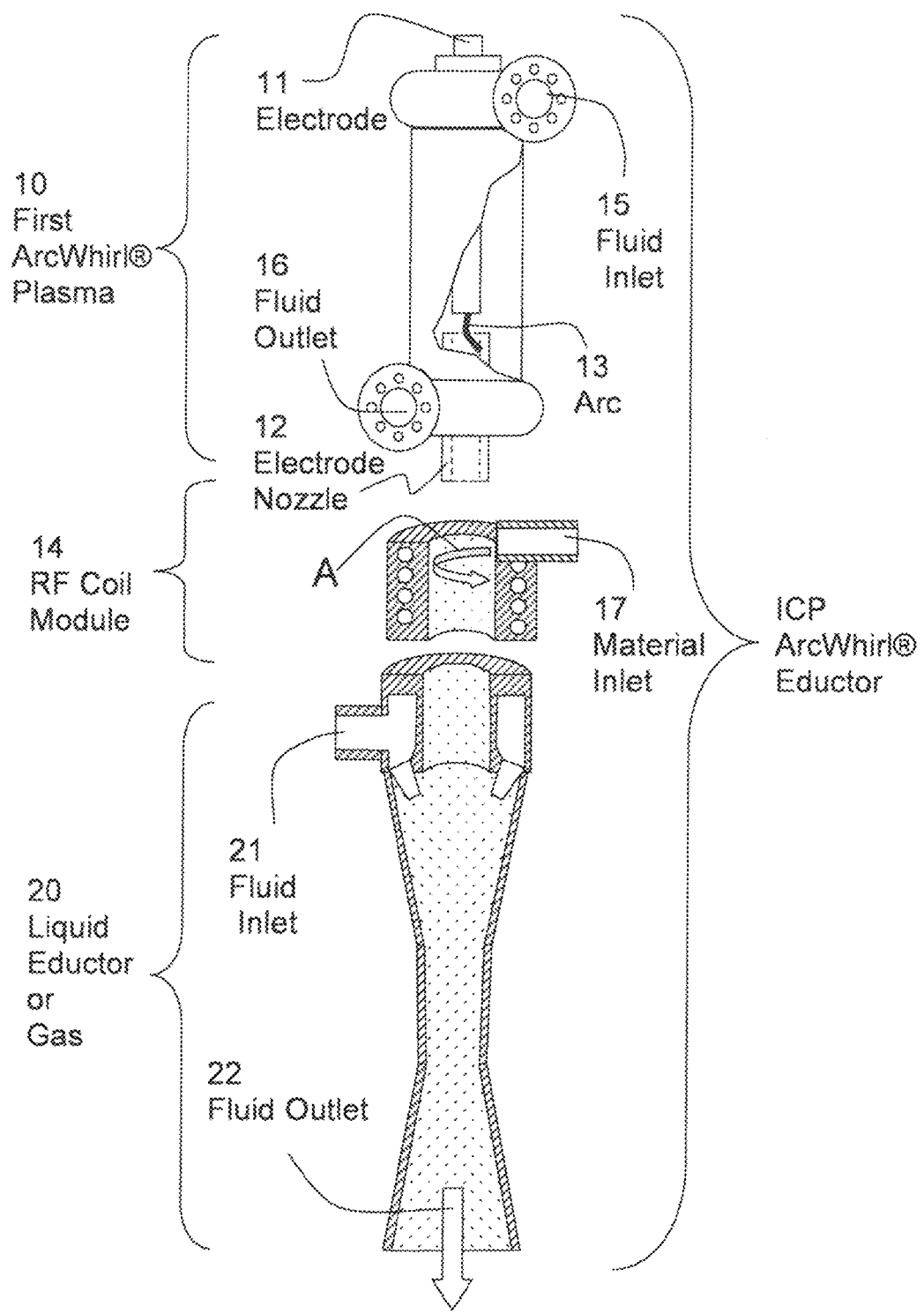
Fig. 6 – ICP ArcWhirl® Eductor

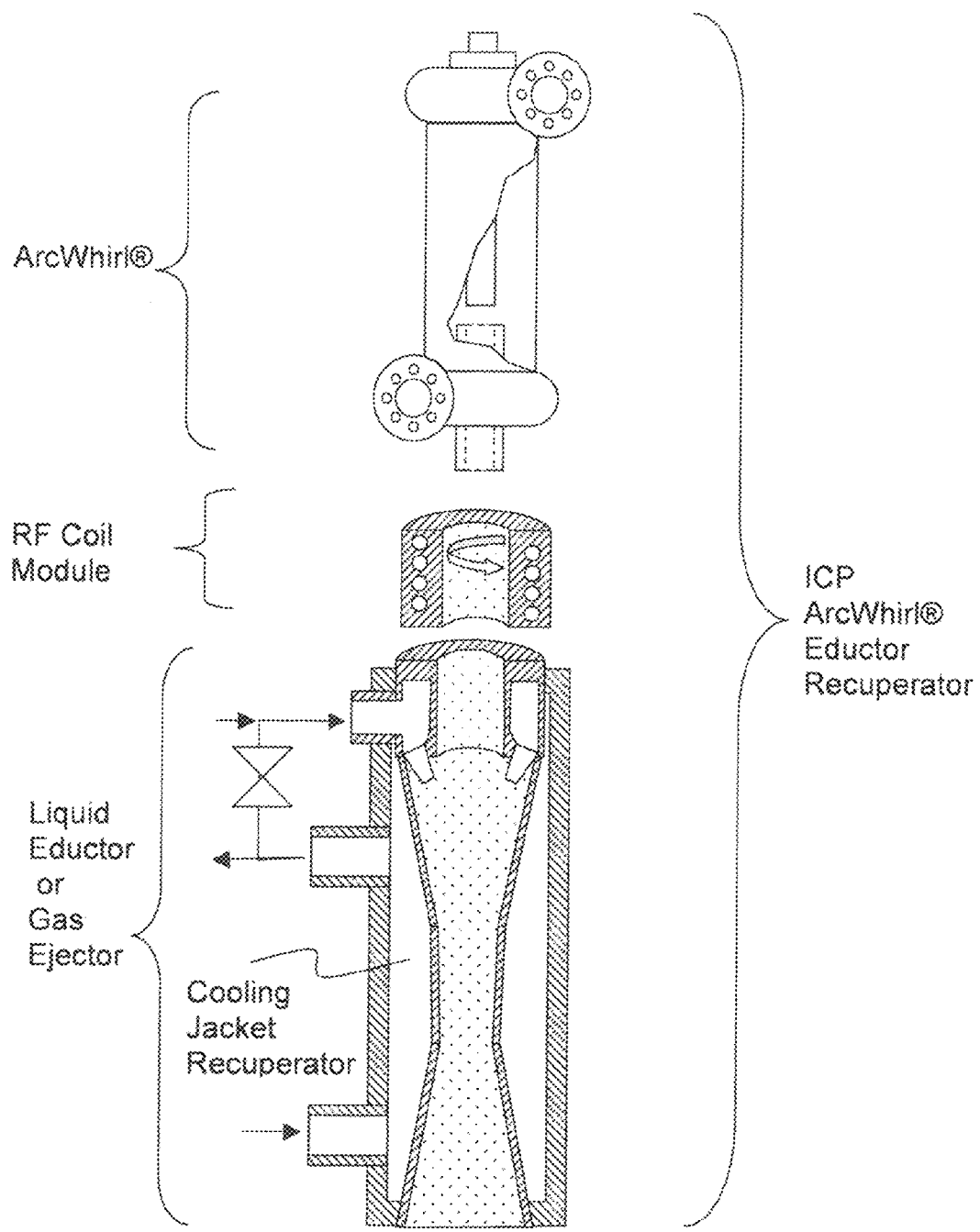
Fig. 7 – ICP ArcWhirl® Eductor Recuperator

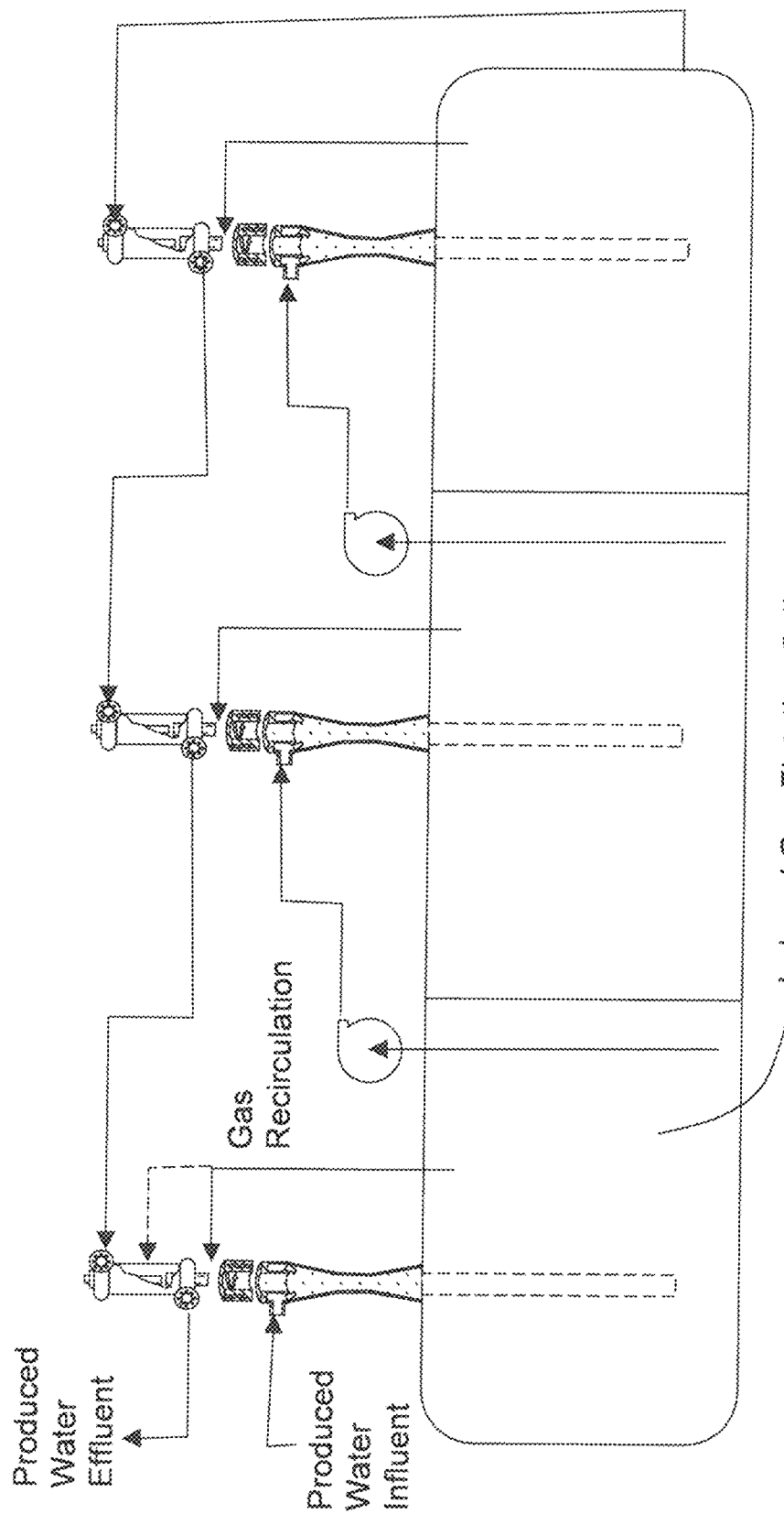
Fig. 8 - ICP ArcWhirl Eductor Induced Gas Flotation Cell

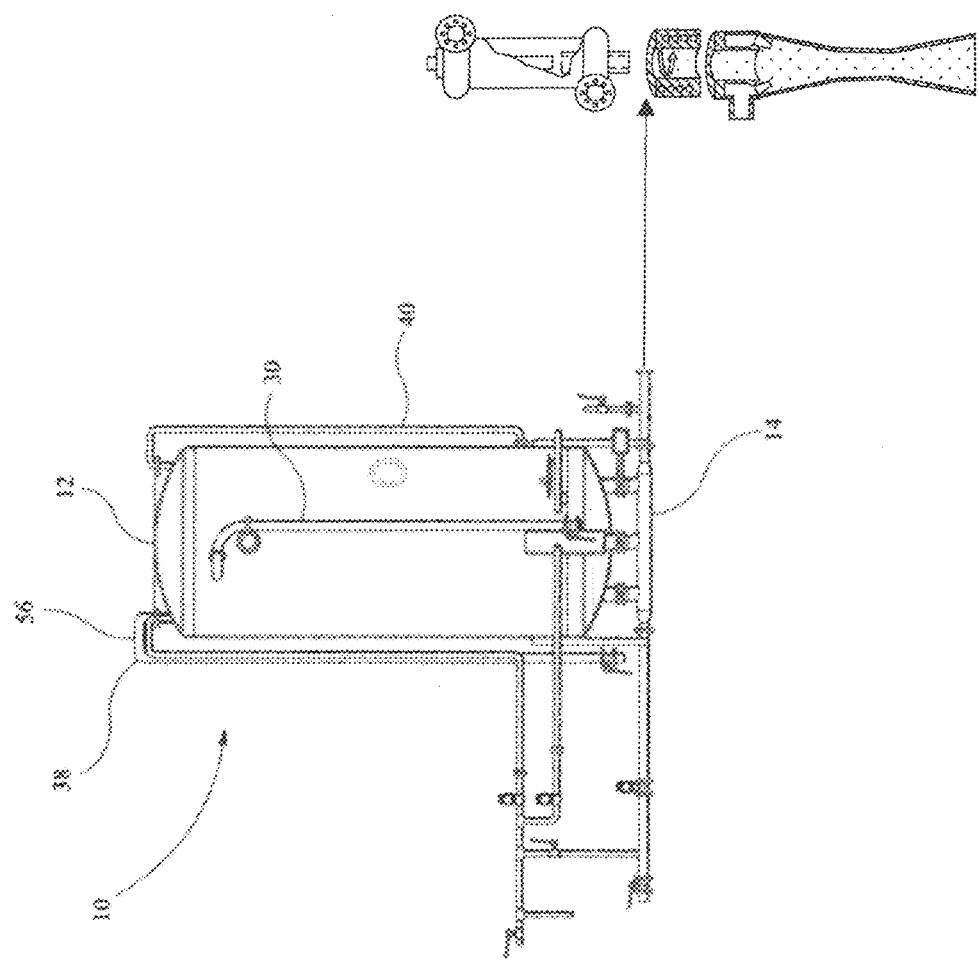
Fig. 9 – ICP ArcWhirl Eductor with HCB Tank

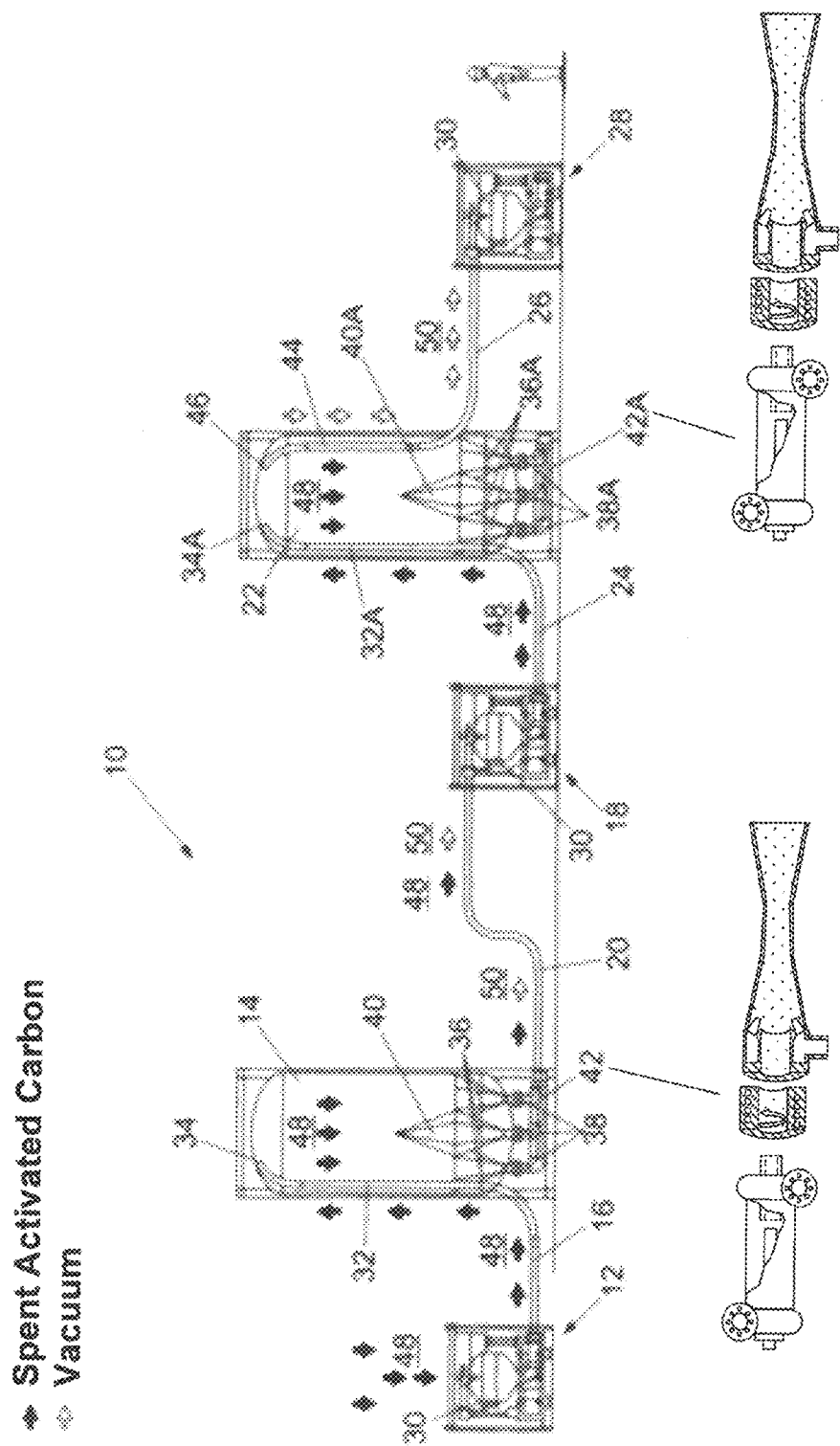
Fig. 10 – ICP ArcWhirl Eductor with HCB Activated Carbon System

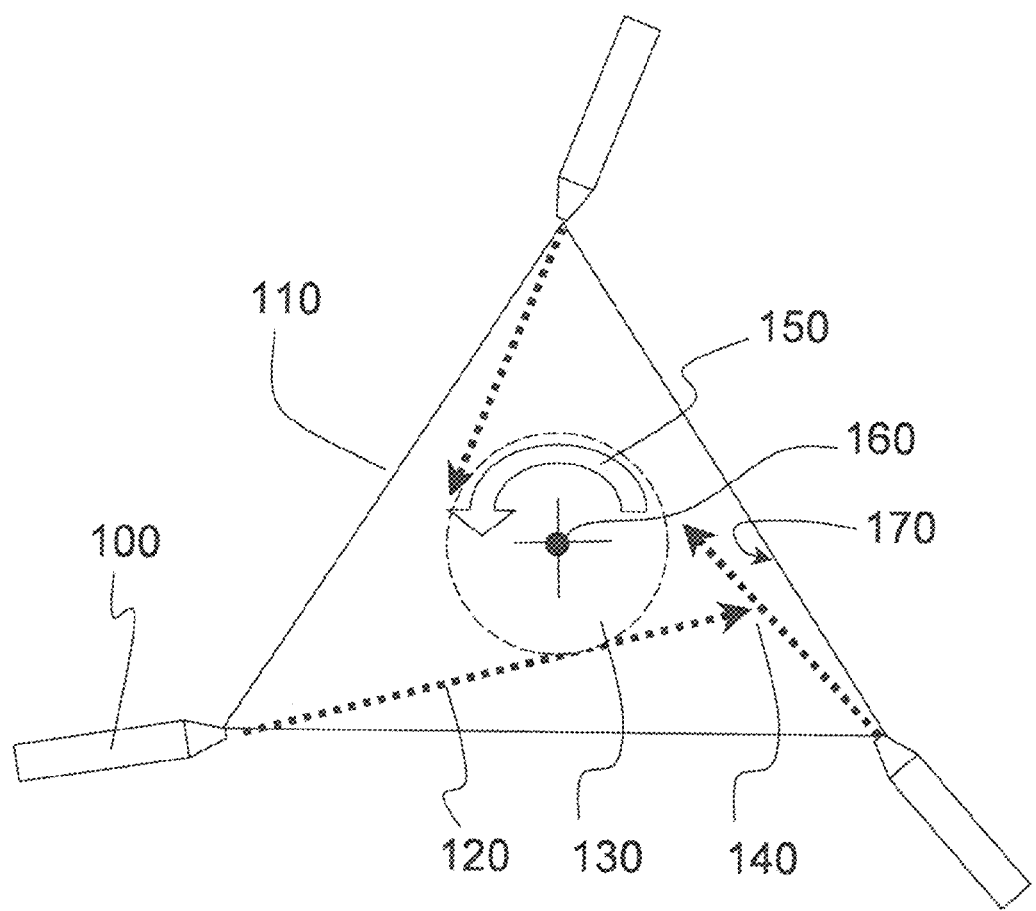
Fig. 11 – Three Torch PlasmaWhirl®

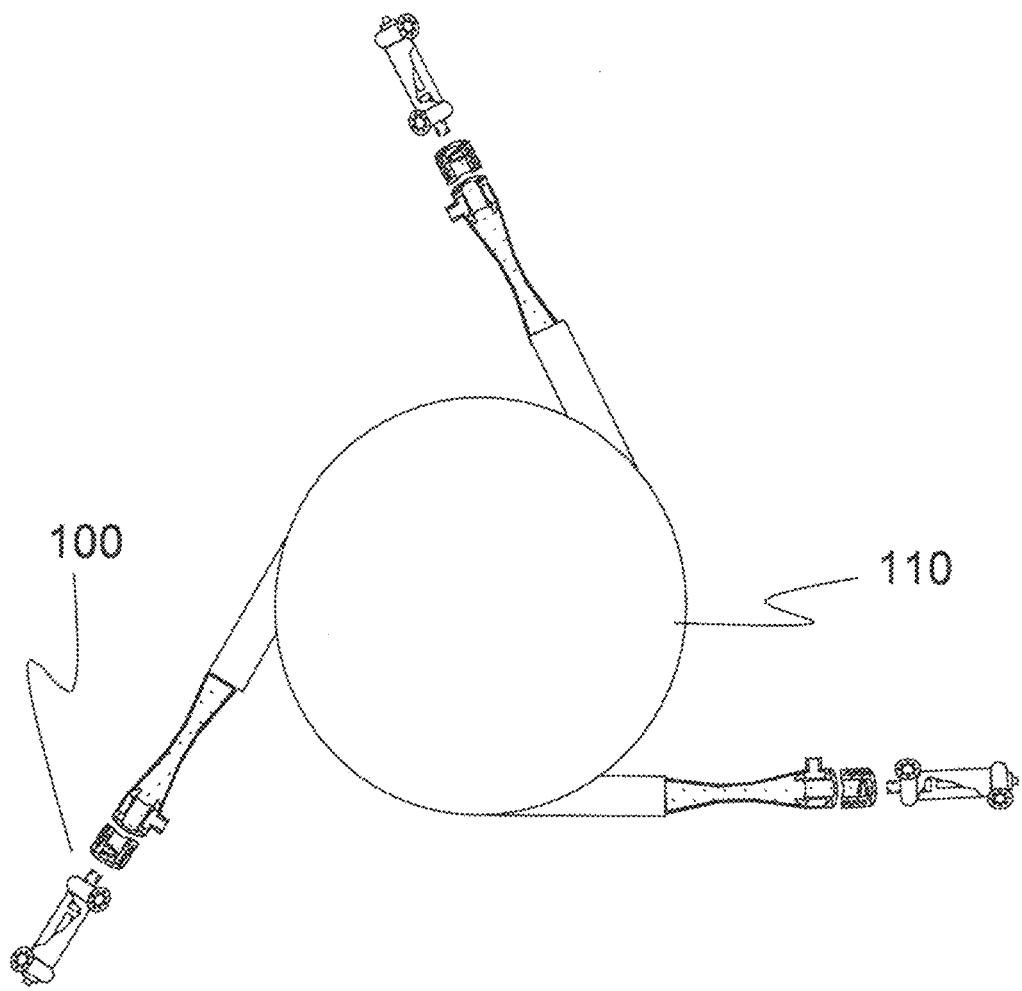
Fig. 12 Three ICP ArcWhirls configured as a Plasma Whirl Reactor

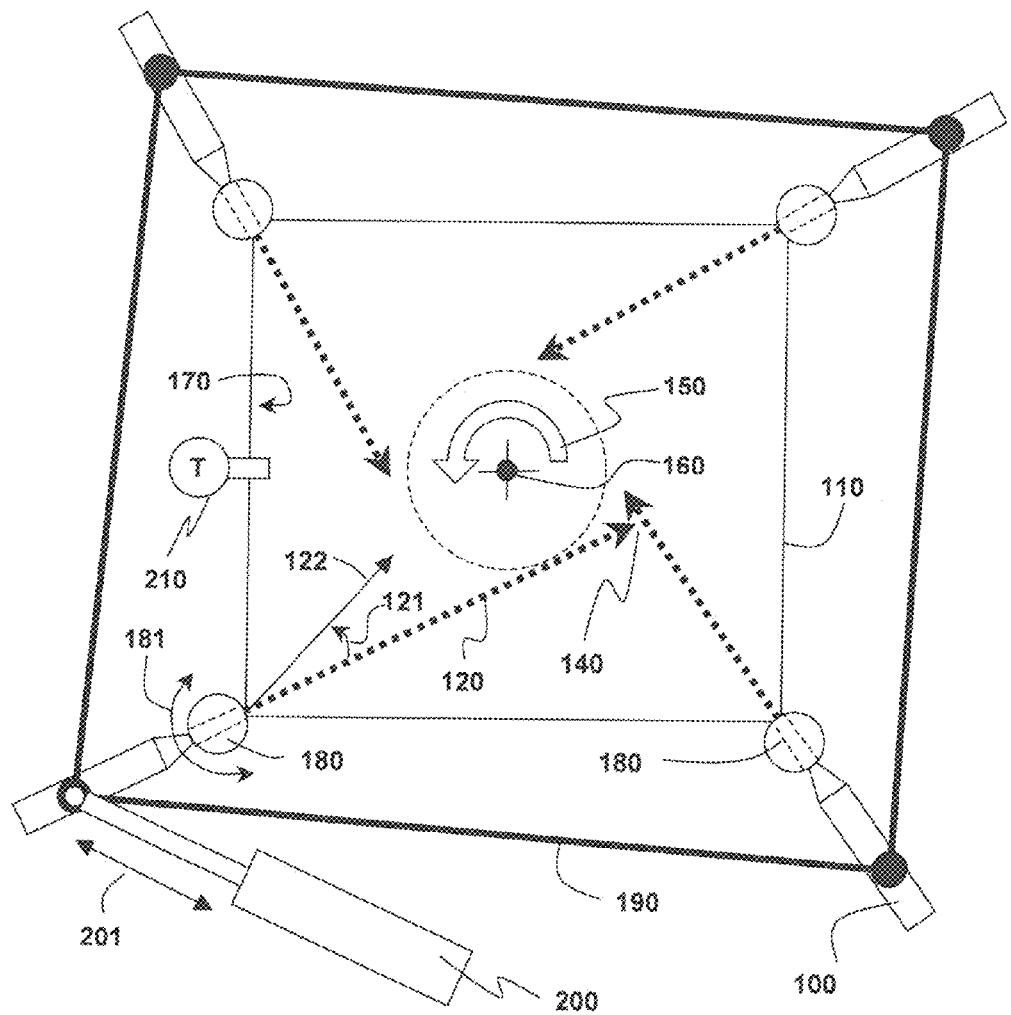
Fig. 13 – R&D Tangentially Fired Plasma Whirl® Module

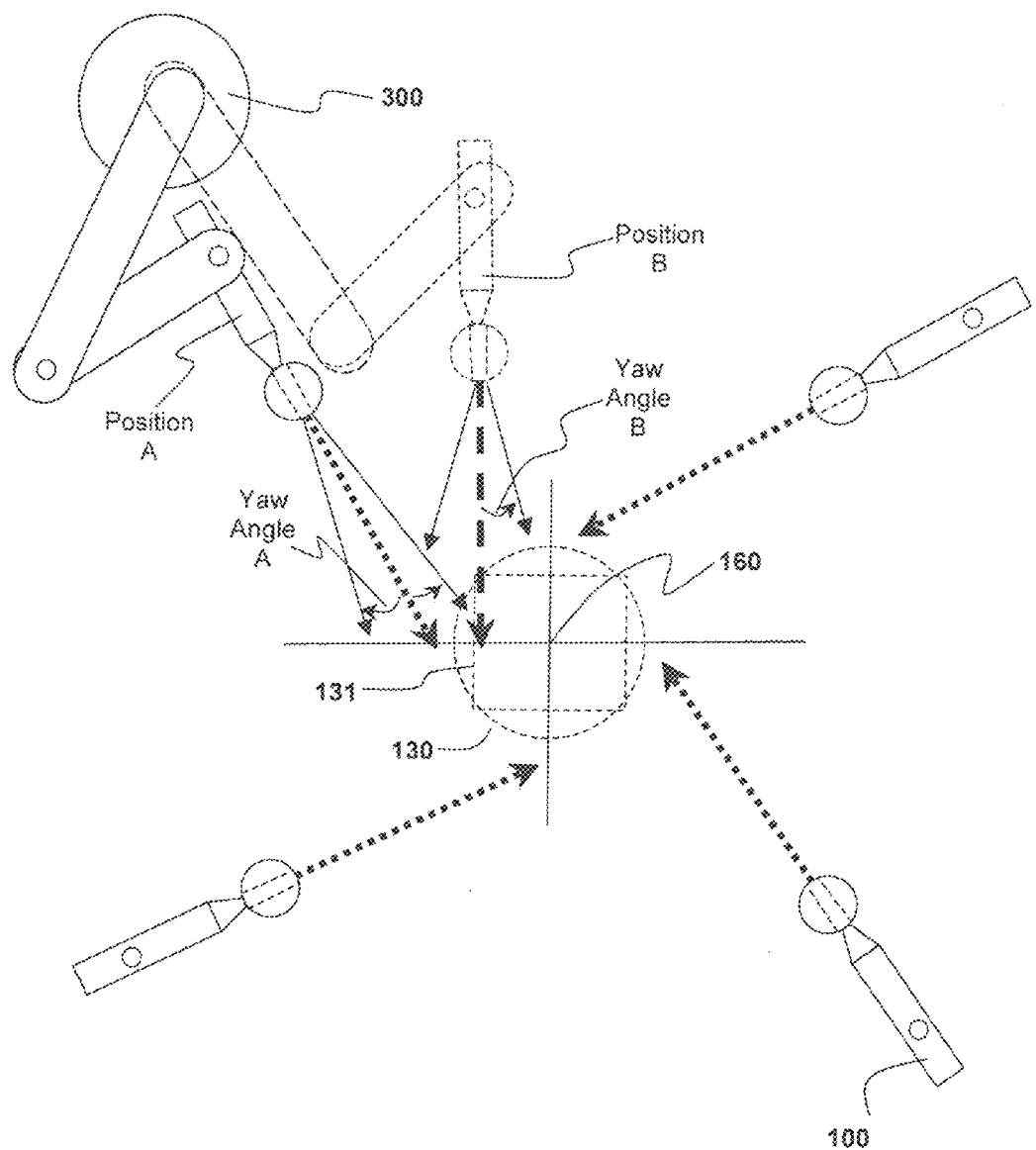
Fig. 14 – R&D Robotic Tangentially Fired Plasma Whirl® Module

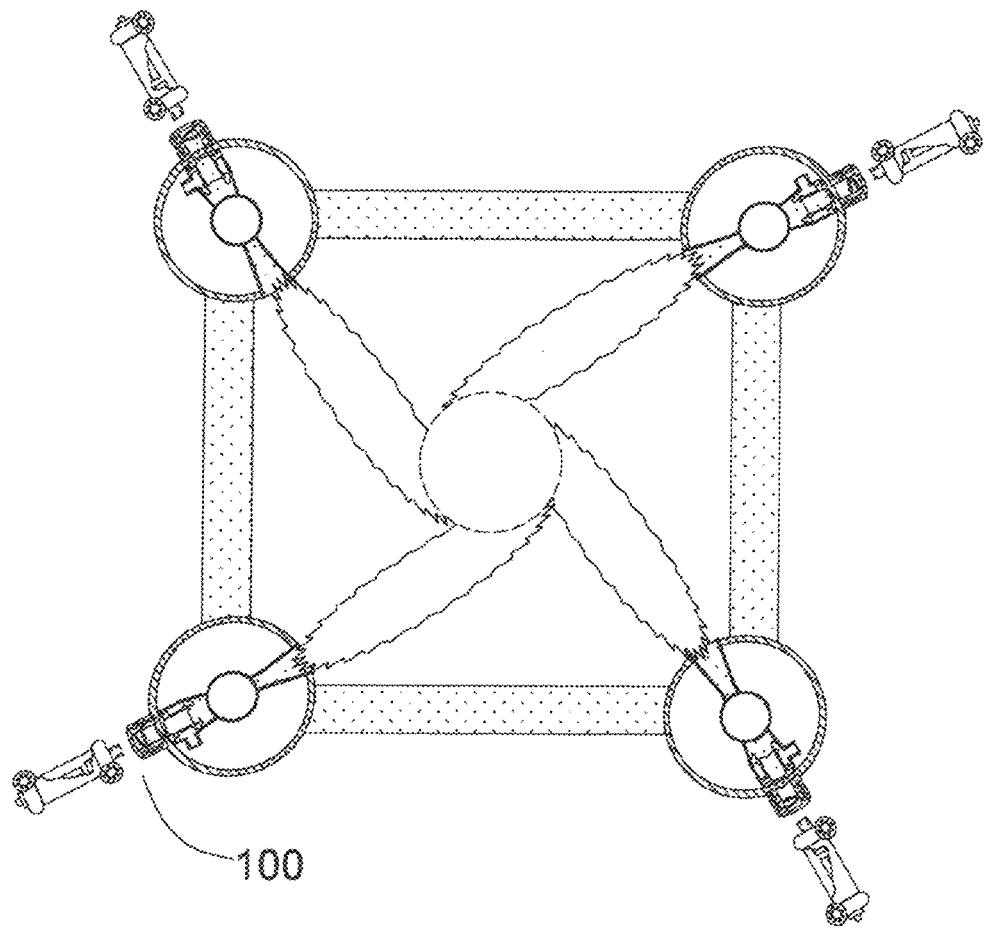
Fig.15 – T-Fired Plasma Whirl® Reactor

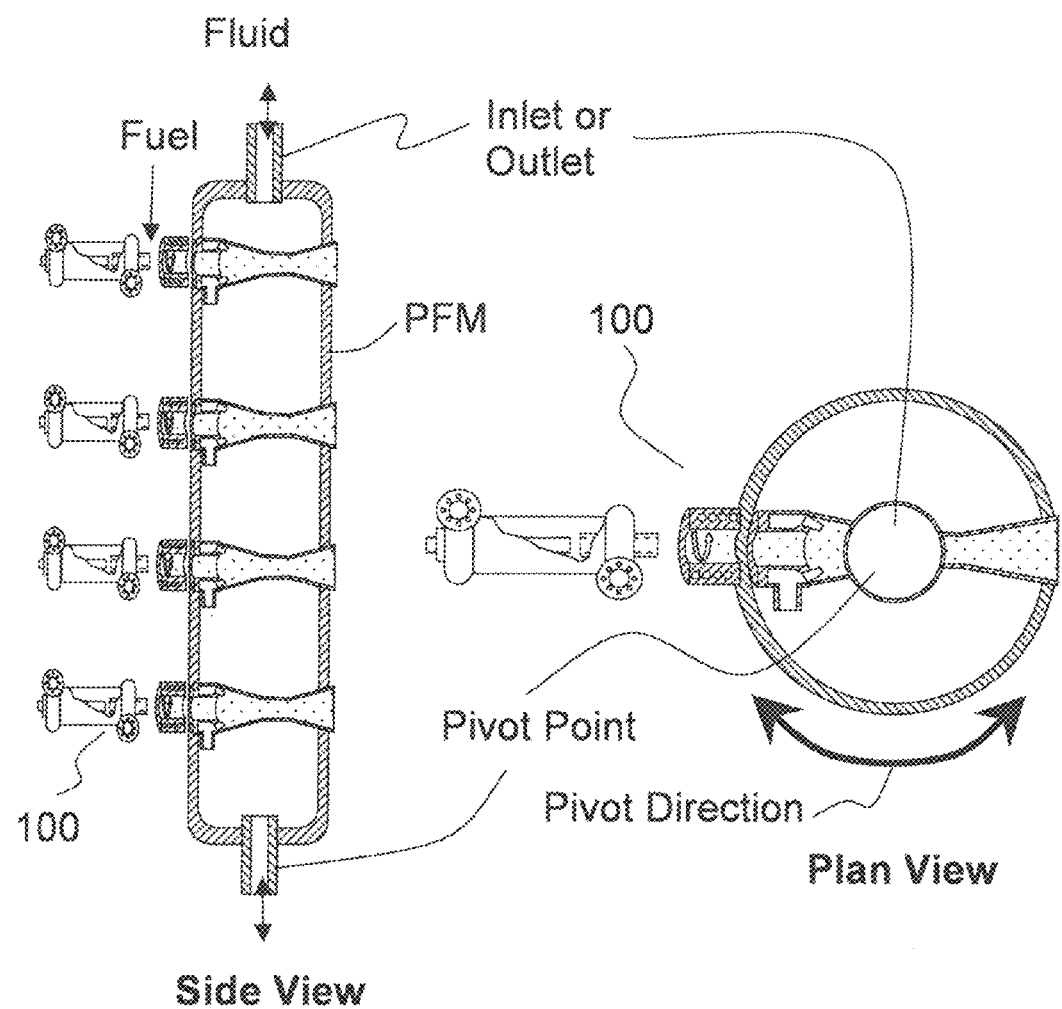
Fig. 16 Linear Recuperator ICP ArcWhirl® Module for Plasma Whirl® Reactor

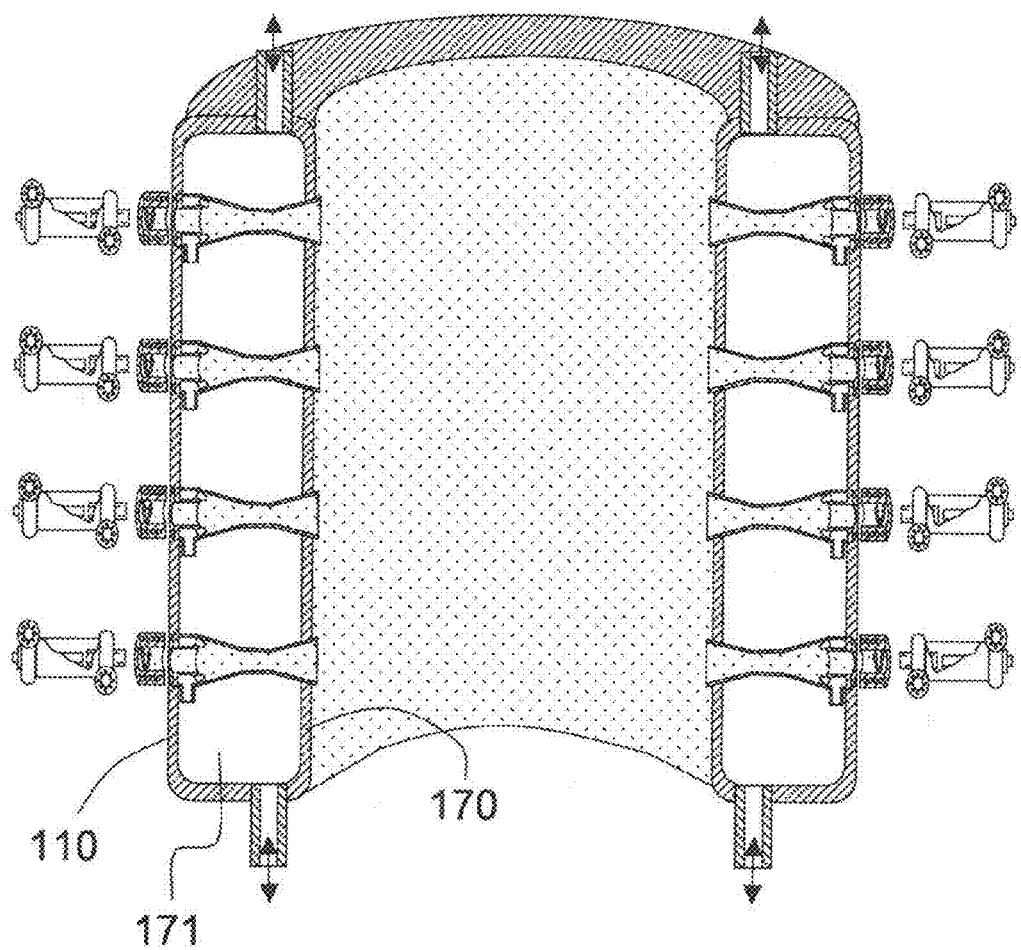
Fig. 17 – Plasma Whirl® Reactor with fixed Linear ICP ArcWhirl® Torches

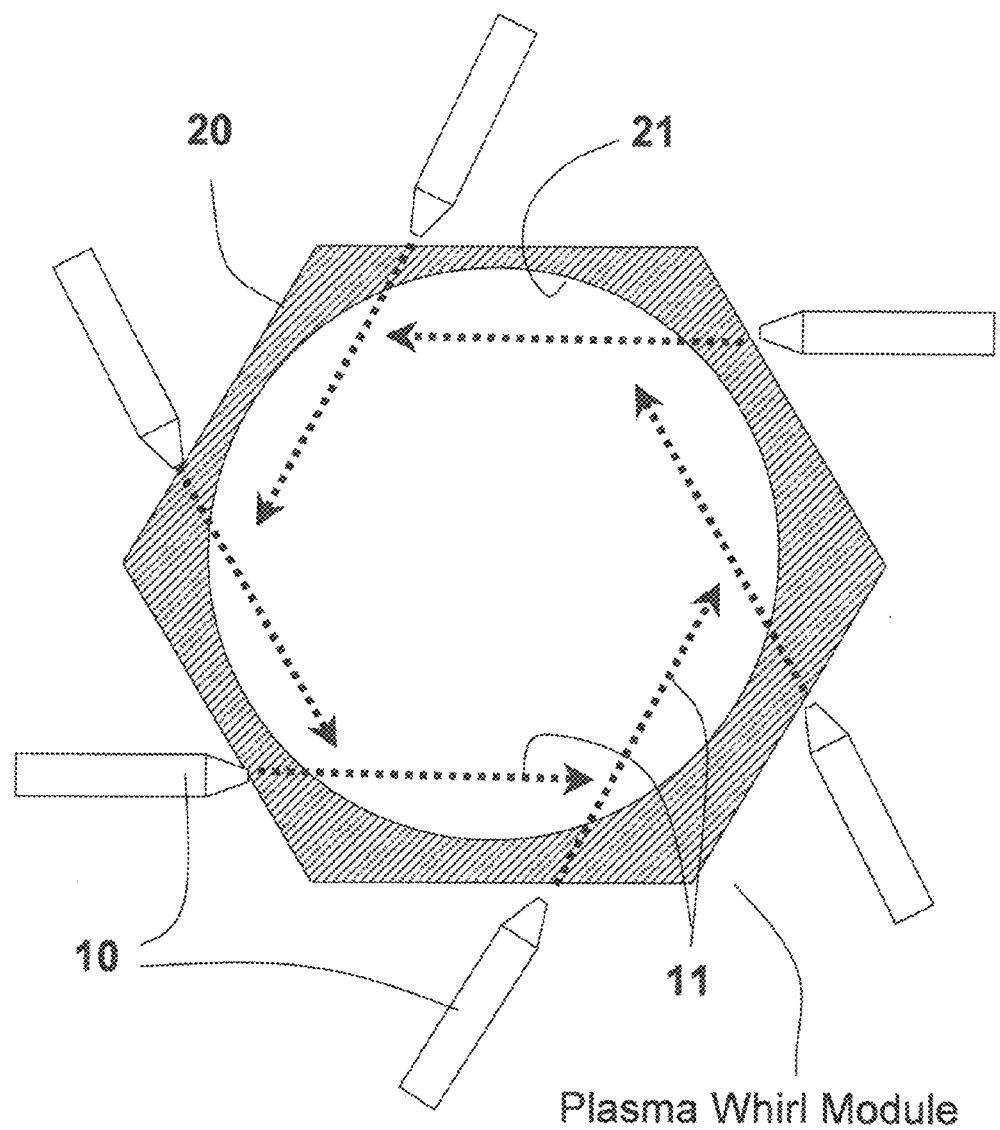
Fig 18 – Sextant Plasma Whirl Confinement Module

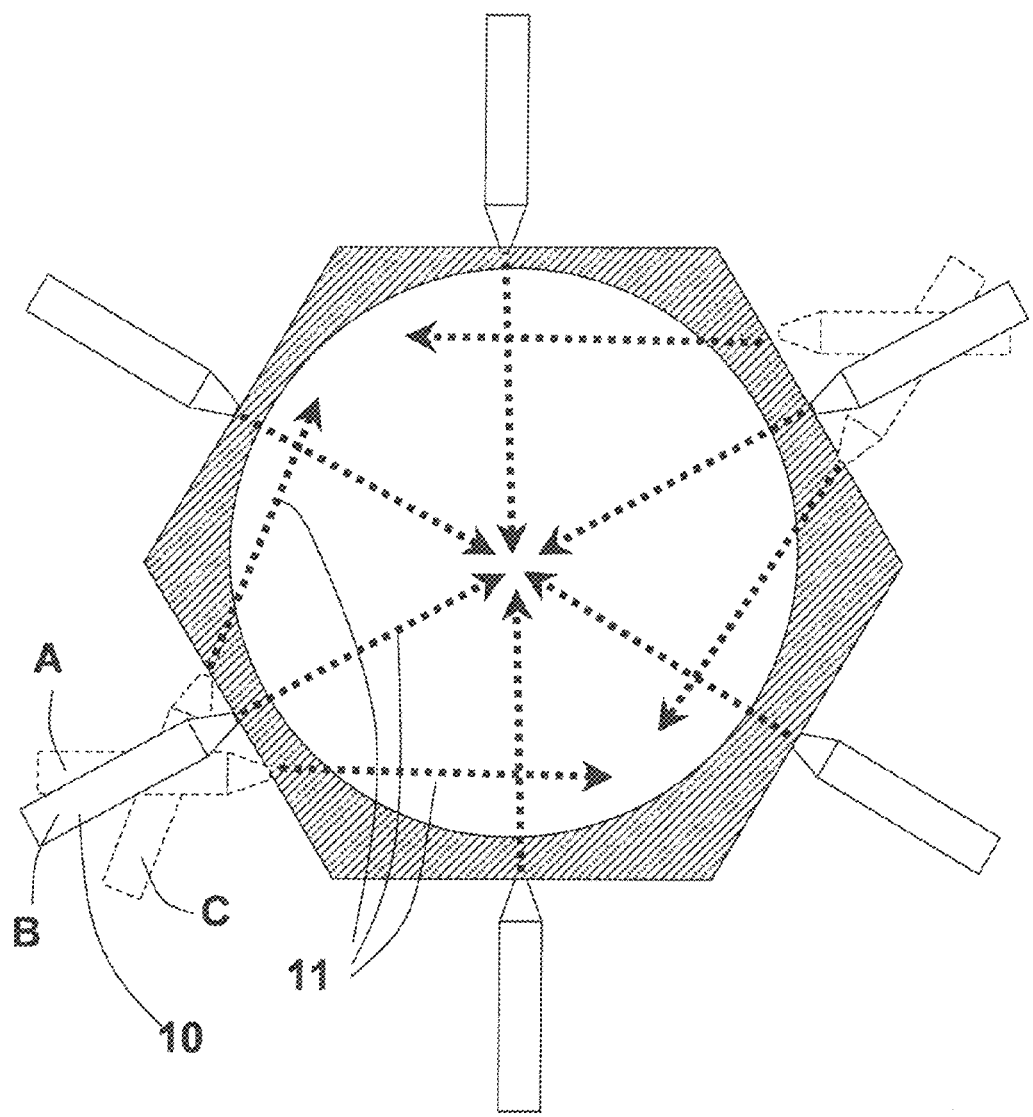
Fig 19 Sextant PWM Yaw Angles

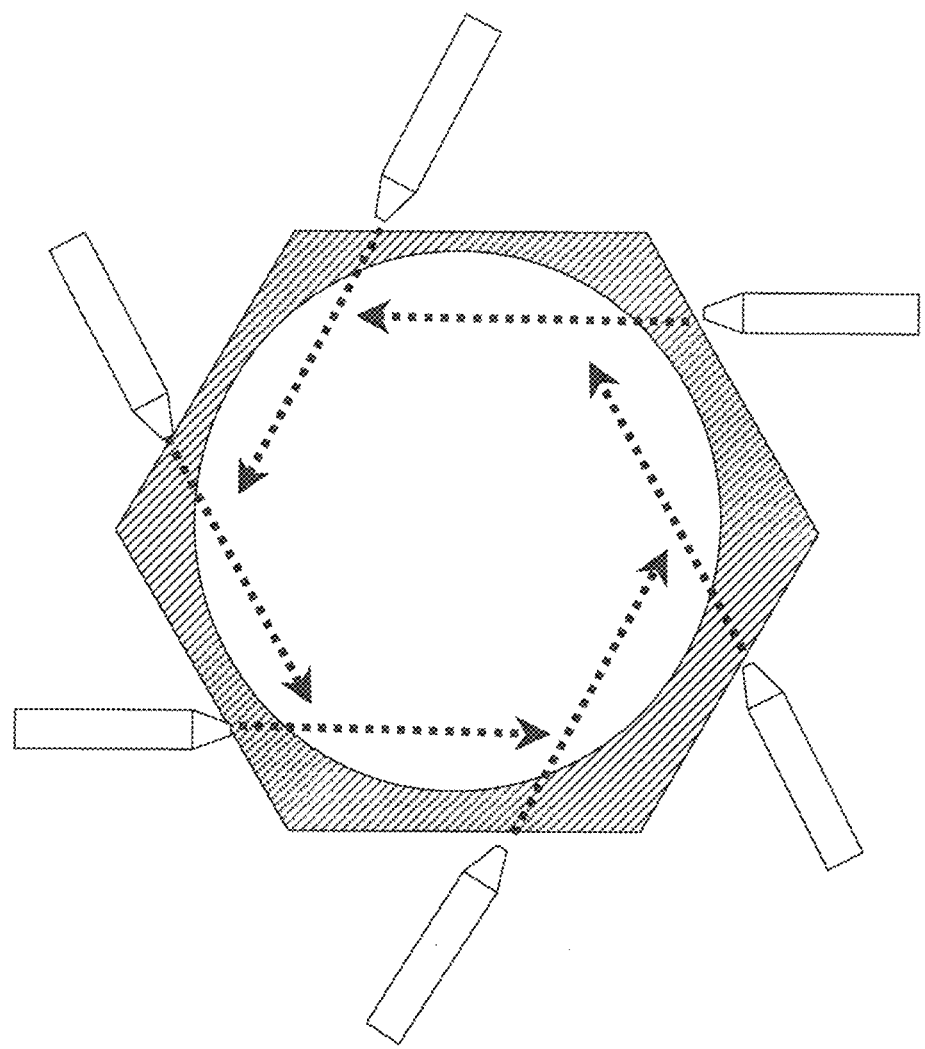
Fig. 20 – Plasma Whirl® Module
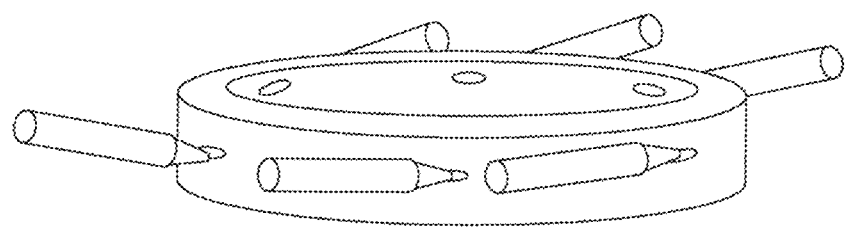
Fig. 21 – Plasma Whirl® Module

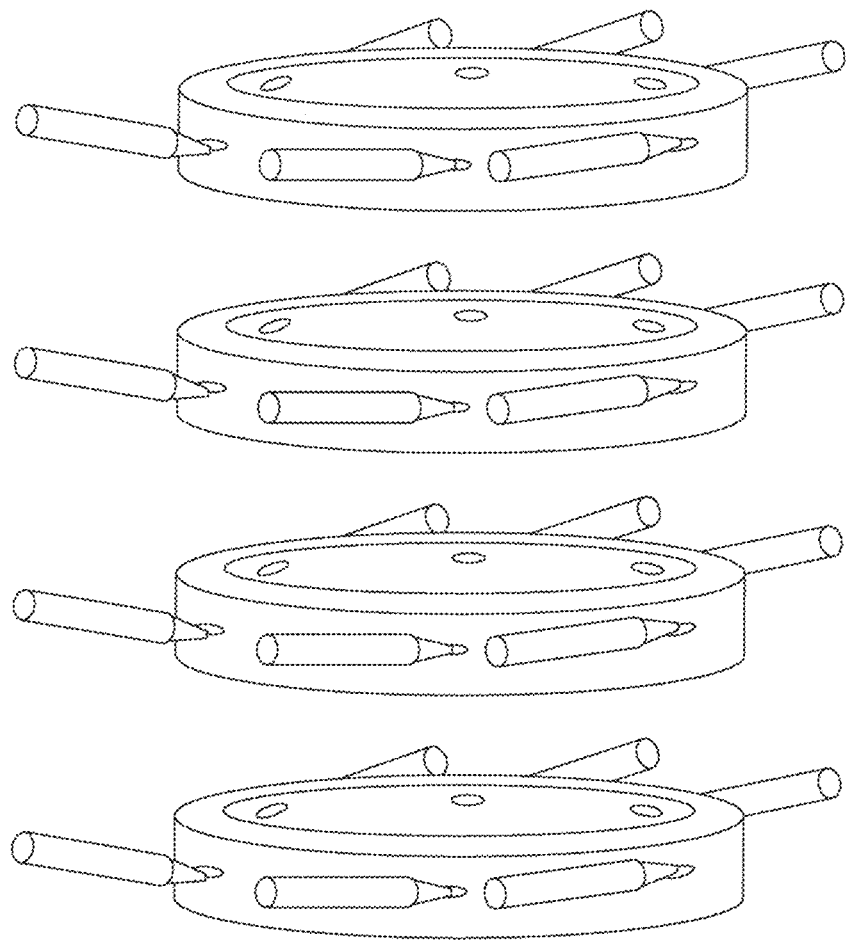
Fig 22 – Stacked Plasma® Whirl Modules

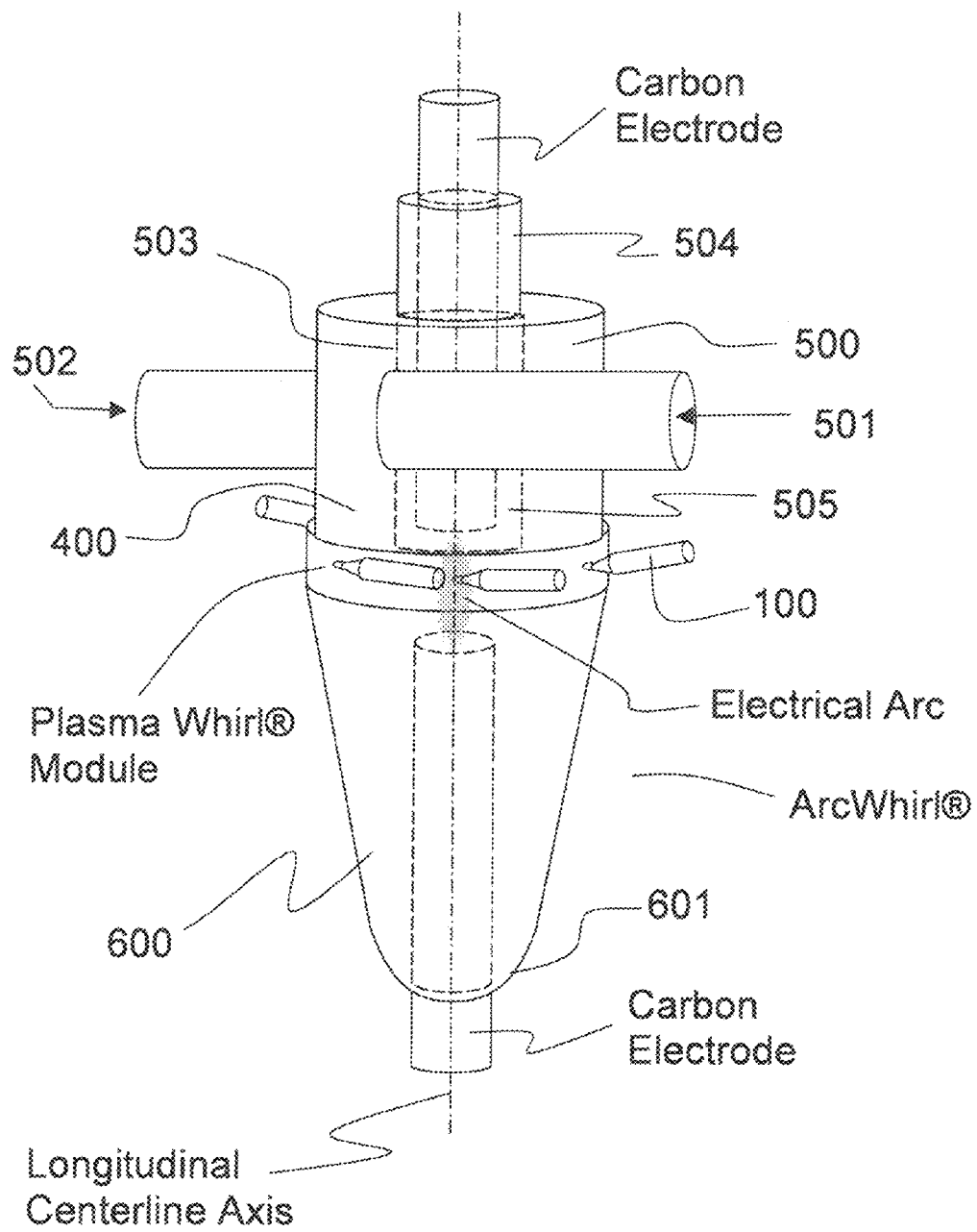
Fig 23 – ArcWhirl® with Plasma Whirl® Module

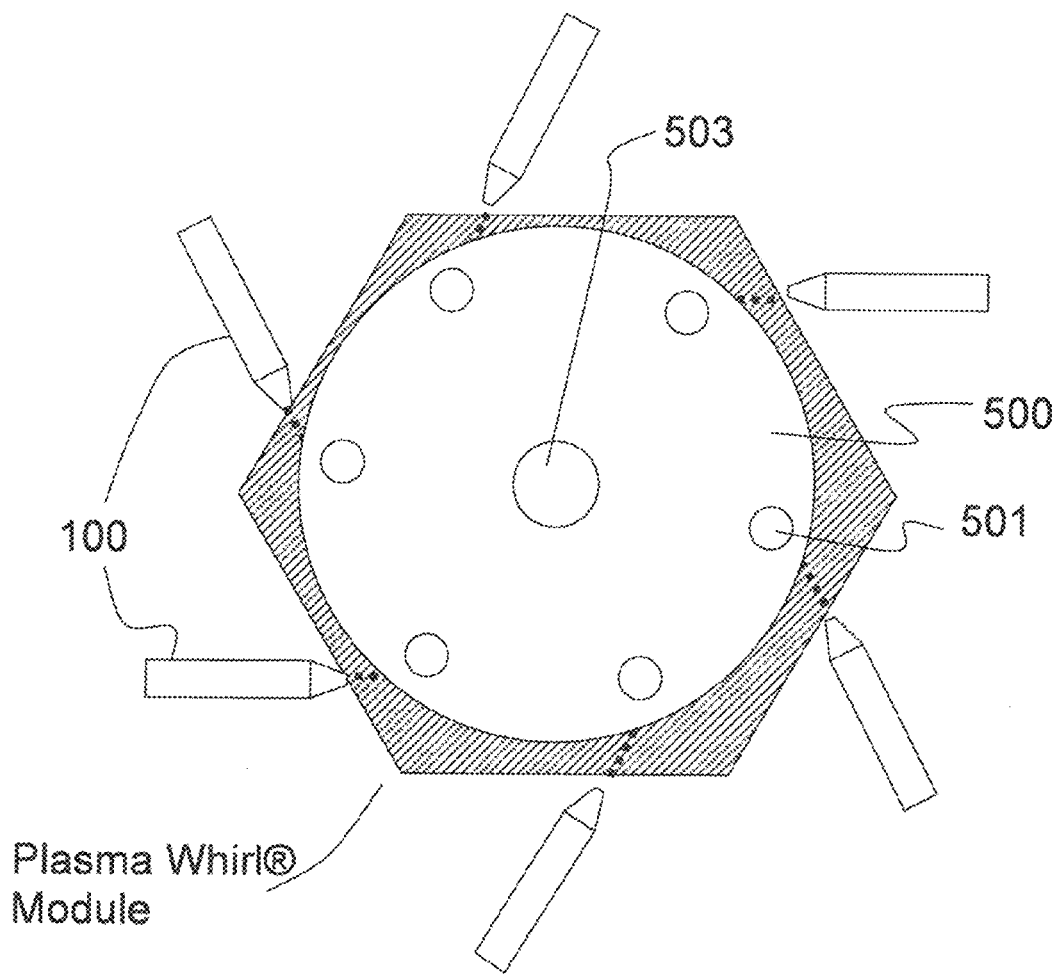
Fig 24 Sextant PWM with six inlets

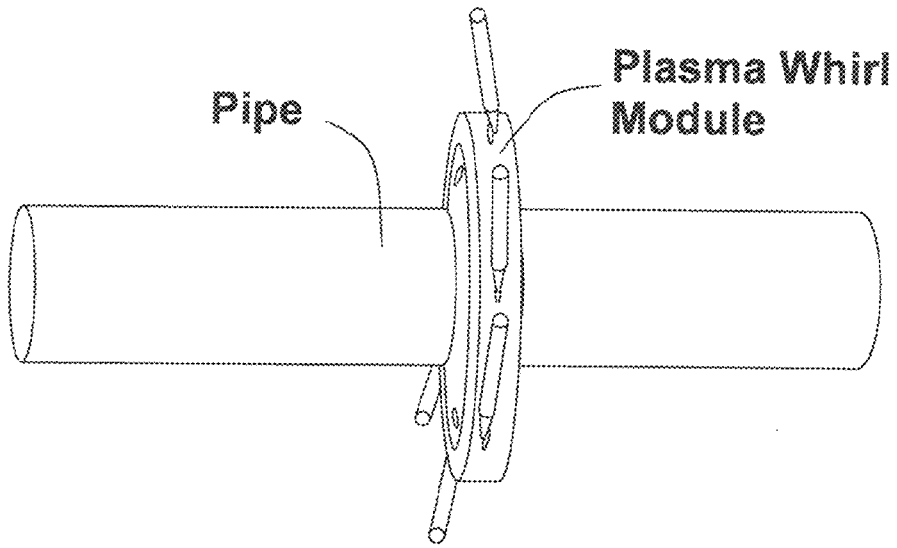
Fig 25 – Plasma Whirl Module PipeCutter, Welding Preheater & Fusion Welder
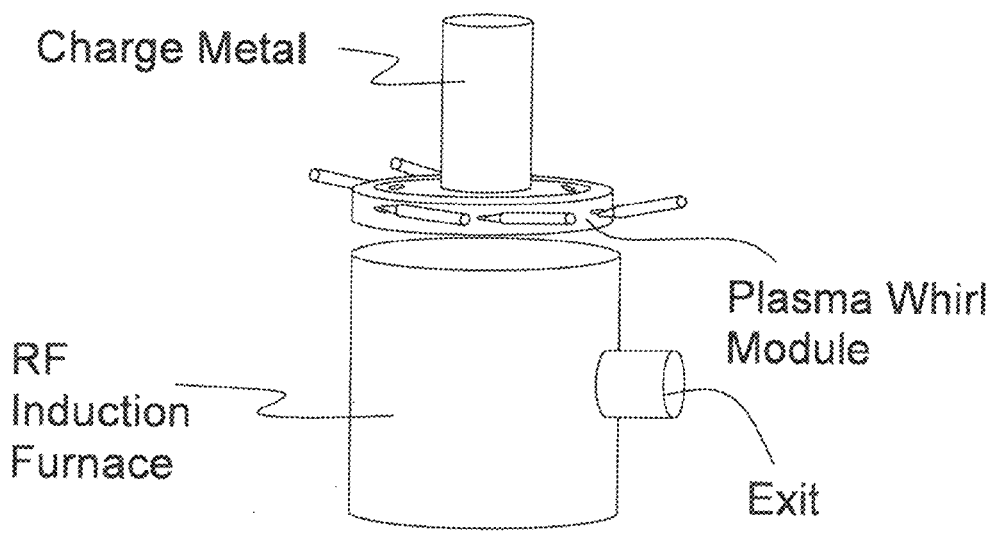
Fig 26 – Plasma Whirl Induction Furnace Charge and Alloy Preheater

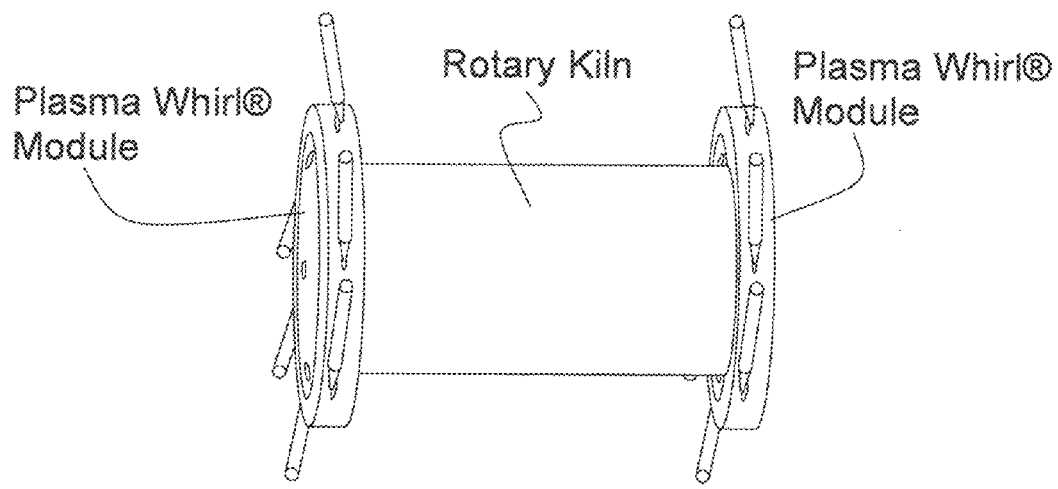
Fig 27 – Rotary Kiln Retrofitted with Plasma Whirl Modules and Converted to Plasma Gasifier
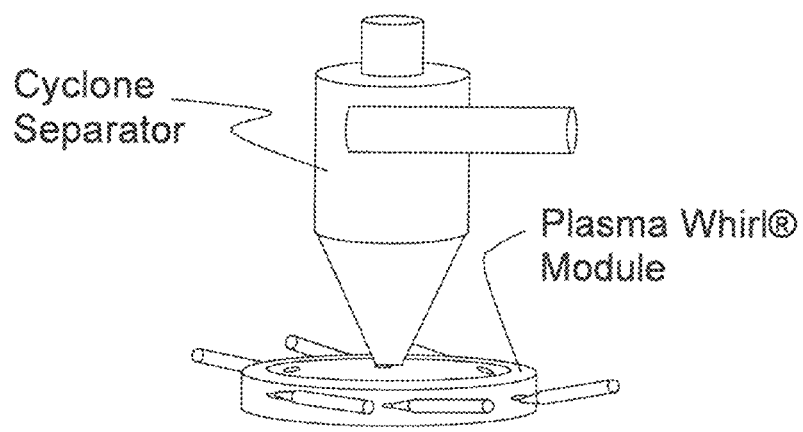
Fig 28 – Cyclone Separator Retrofitted with Plasma Whirl Module

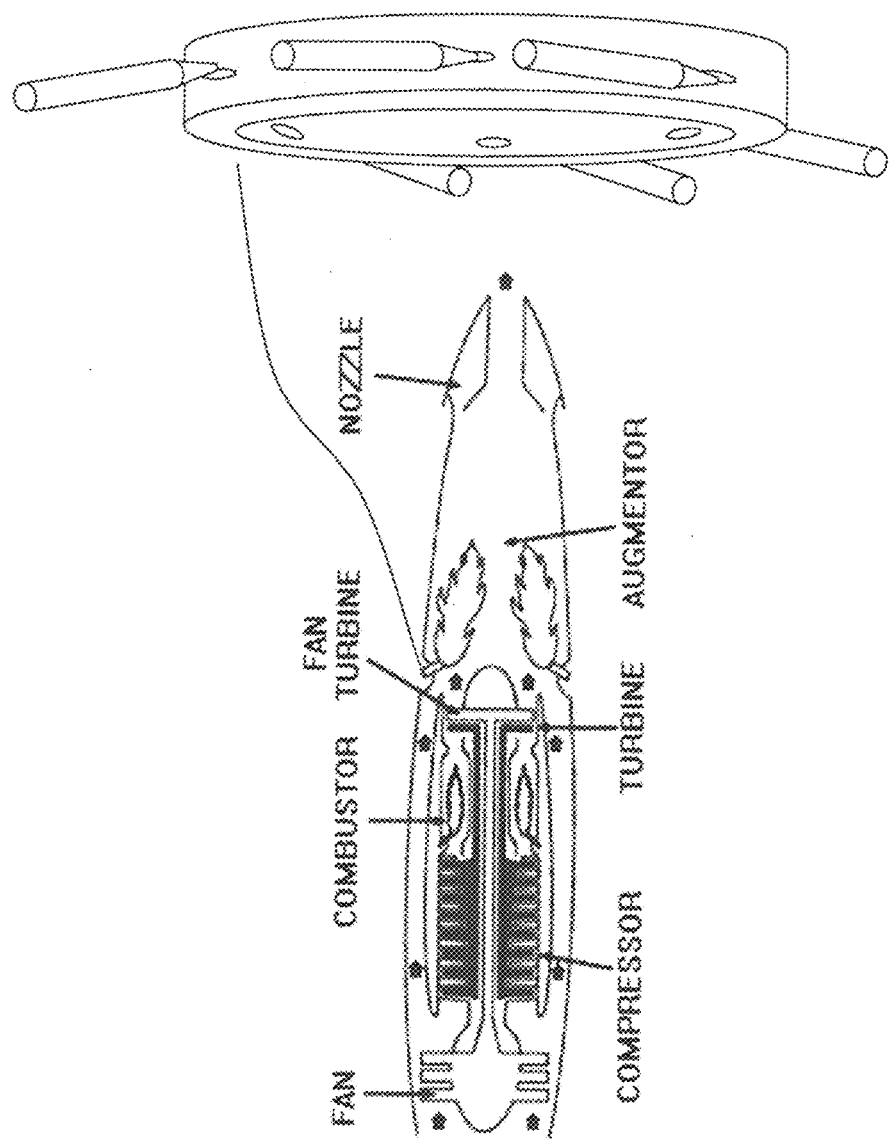
Fig 29 – Gas Turbine PWM Augmentor

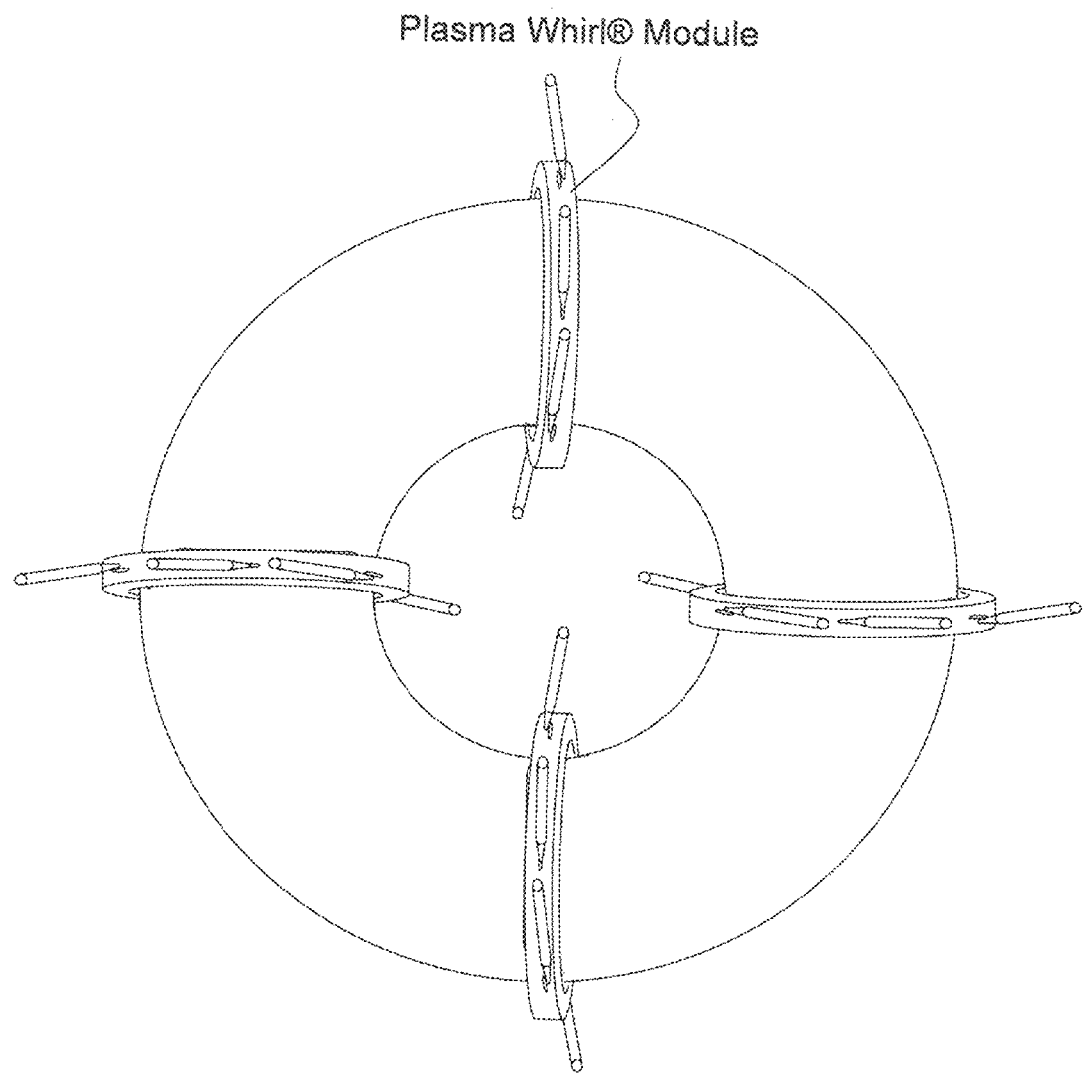
Fig 30 – Tokama Retrofitted with Plasma Whirl Modules

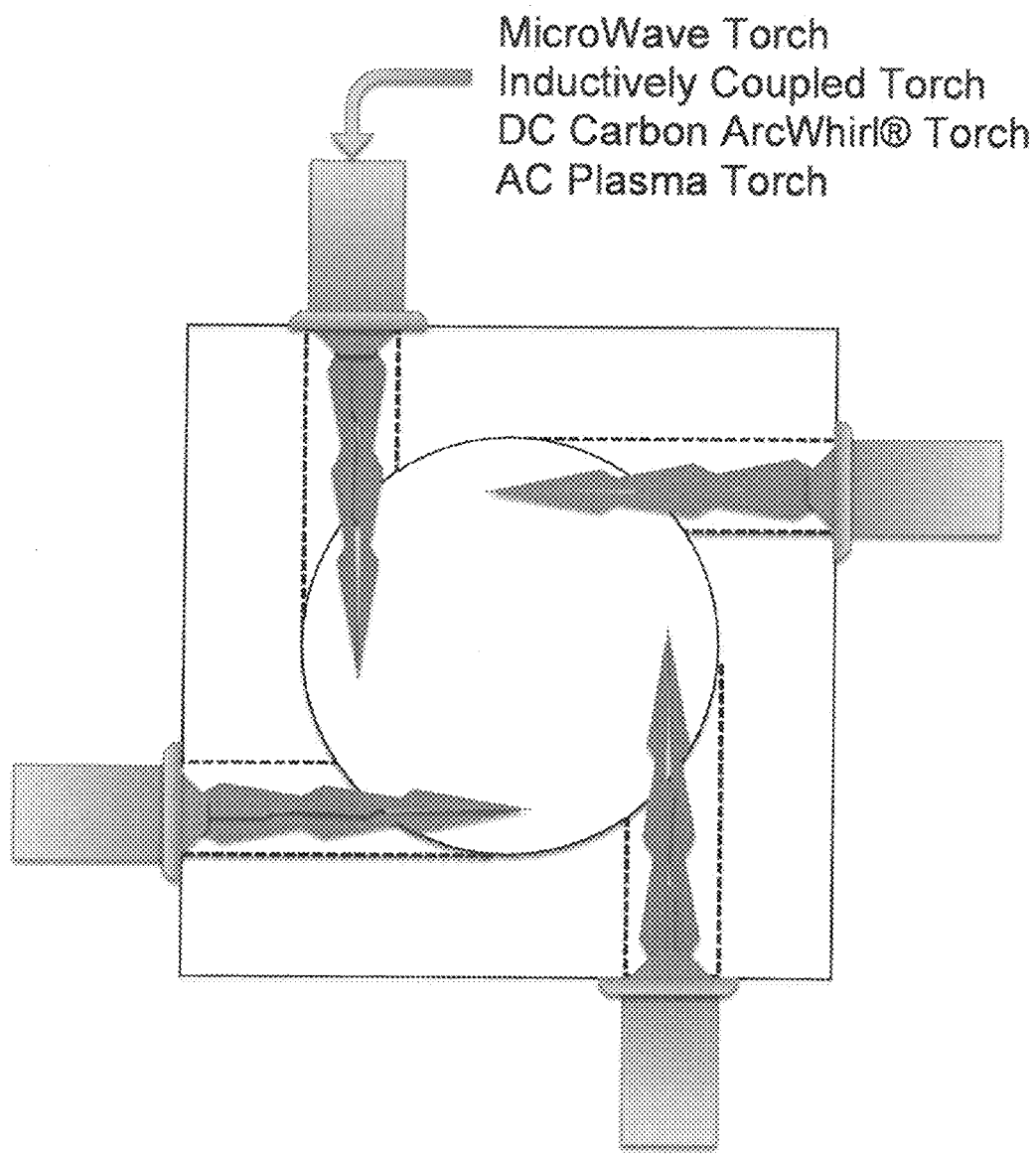
Fig 31 - Four Torch Plasma Whirl® Reactor

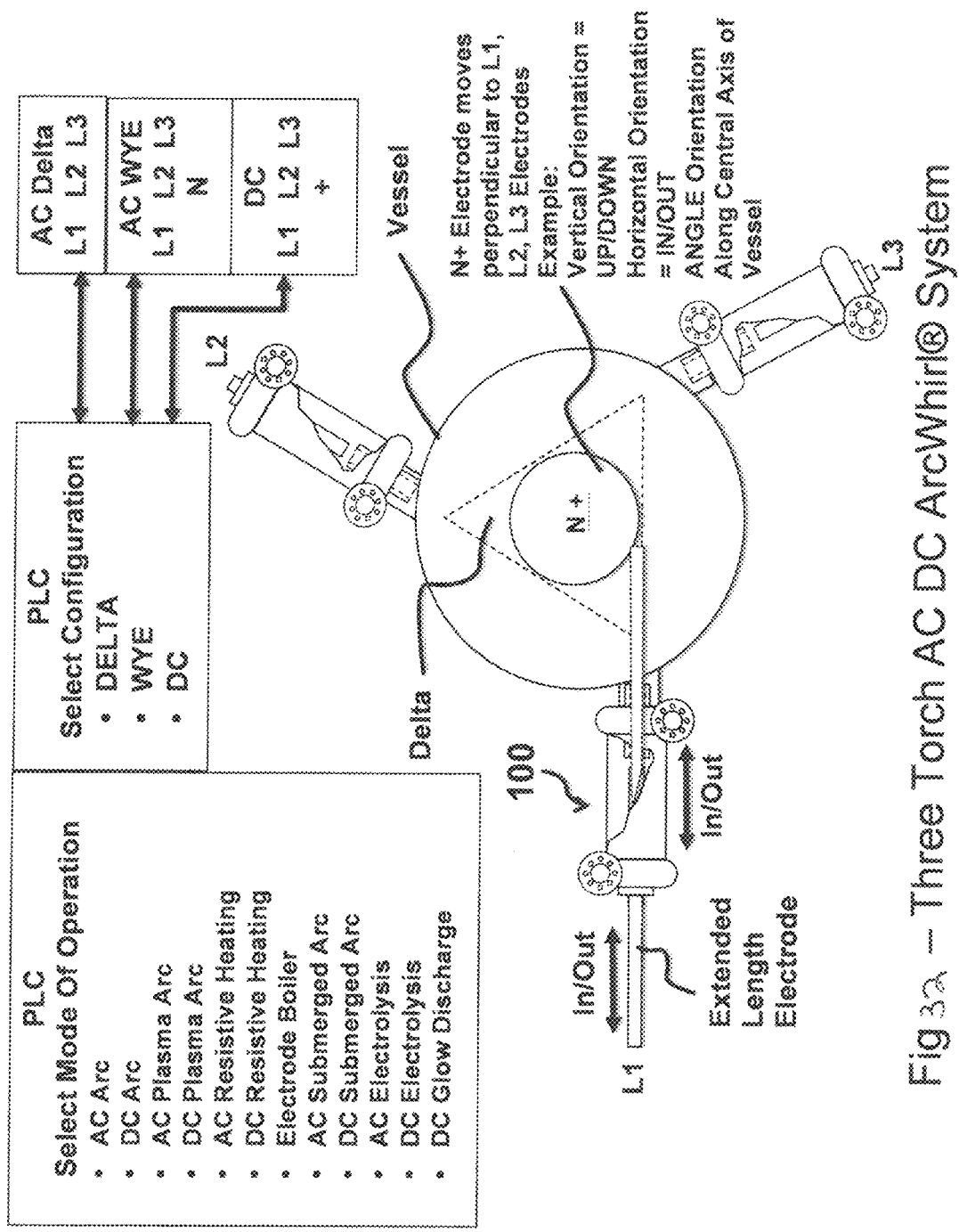
Fig 3a – Three Torch AC DC ArcWhirl® System

PLASMA WHIRL REACTOR APPARATUS AND METHODS OF USE

FIELD OF THE INVENTION

The present invention relates generally to the field of plasma confinement, and more particularly, to a system, method and apparatus for creating, confining and sustaining a dense inductively coupled plasma arc whirl.

PRIORITY CLAIM AND CROSS-REFERENCE TO RELATED APPLICATIONS

This patent application is related to: This patent application is (a) a non-provisional application of U.S. patent application 61/787,682 filed on Mar. 15, 2013, and entitled "System, Method and Apparatus for Creating, Confining and Sustaining a Dense Inductively Coupled Plasma Arc Whirl", (b) a non-provisional application of U.S. patent application 61/788,244 filed on Mar. 15, 2013, and entitled "Plasma Whirl Reactor Apparatus and Methods of Use", and (c) a continuation-in-part application of U.S. patent application Ser. No. 13/633,128 filed on Oct. 1, 2012, entitled "Plasma Arc Torch Having Multiple Operating Modes", which is a continuation-in-part application of U.S. patent application Ser. No. 12/371,575 filed on Feb. 13, 2009, now U.S. Pat. No. 8,278,810 (see below). This application also claims priority to PCT patent application PCT/US2013/062941 filed on Oct. 1, 2013, entitled "Plasma Arc Torch Having Multiple Operating Modes".

U.S. patent application Ser. No. 12/371,575 filed on Feb. 13, 2009, now U.S. Pat. No. 8,278,810, and entitled "Solid Oxide High Temperature Electrolysis Glow Discharge", which is (a) a continuation-in-part application of U.S. patent application Ser. No. 12/288,170 filed on Oct. 16, 2008 and entitled "System, Method And Apparatus for Creating an Electric Glow Discharge", which is a non-provisional application of U.S. provisional patent application 60/980,443 filed on Oct. 16, 2007 and entitled "System, Method and Apparatus for Carbonizing Oil Shale with Electrolysis Plasma Well Screen"; (b) a continuation-in-part application of U.S. patent application Ser. No. 12/370,591 filed on Feb. 12, 2009, now U.S. Pat. No. 8,074,439, and entitled "System, Method and Apparatus for Lean Combustion with Plasma from an Electrical Arc", which is non-provisional patent application of U.S. provisional patent application Ser. No. 61/027,879 filed on Feb. 12, 2008 and entitled, "System, Method and Apparatus for Lean Combustion with Plasma from an Electrical Arc"; and (c) a non-provisional patent application of U.S. provisional patent application 61/028,386 filed on Feb. 13, 2008 and entitled "High Temperature Plasma Electrolysis Reactor Configured as an Evaporator, Filter, Heater or Torch." All of the foregoing applications are hereby incorporated by reference in their entirety.

This application is also related to U.S. patent application Ser. No. 61/788,404 filed on Mar. 15, 2013 and entitled "System, Method and Apparatus for an Inductively Coupled Plasma Arch Whirl Filter Press." This application is also related to U.S. Pat. No. 7,422,695 and U.S. Pat. No. 7,857,972 and multiple patents and patent applications that claim priority thereto. All of the foregoing applications are hereby incorporated by reference in their entirety.

BACKGROUND OF THE INVENTION

Without limiting the scope of the invention, its background is described in connection with produced water generated from Oil & Gas Wells, for example frac flowback for shale gas and produced water from deepwater oil platforms. In addition, the scope of the invention also includes Exploration and Production (E&P) waste generated during the drilling of an oil or gas well or waste generated during the production of oil or gas, such as produced water, frac flowback, spent carbon, oily sludges, lime or any other E&P waste, whether solid, liquid or gas such as flare gas.

During the past decade the need for oil and natural gas has increased in dramatic fashion. With the increase in foreign oil dependency, uncertain oil prices, environmental concerns and the lack of sufficient energy supplies as seen recently in California, for example, the oil and gas industry has turned to unconventional resources such as shale gas, ultra deepwater oil in the Gulf of Mexico, oil sands, oil shale and coal bed methane.

The development of many of these unconventional fossil fuel resources requires unique approaches. For example, oil sand development is shifting from mining to in situ known as steam assisted gravity drainage (SAGD) which incorporates two horizontal wells, one placed above the other. Steam is flowed into the top injection well to "melt" the bitumen which then flows to the bottom production well. The bitumen and water flow to the surface and are separated and then the water is treated, heated and flashed to steam for reuse. Many types of waste are generated during the SAGD water treatment process.

The development of shale gas resources requires hydraulic fracturing the wells in order to stimulate the formation so that the gas can flow to the well. Since the medium used for fracturing wells is water it has now become the lifeblood of Shale plays since shale development requires significant amounts of water.

An emerging problem in the shale gas plays is "What to do with the Frac Flowback?" from shale gas wells. Shales are unconventional gas formations that are in very tight geological formations. The word tight is commonly used to mean little to no porosity. Thus, a gas shale formation does not naturally flow to the production tubing in a well.

As previously stated the well must be stimulated to flow and the most common stimulation practice today is hydraulic fracturing the well with water. The water used in hydraulic fracturing is commonly referred to as frac water. In order to get the water to flow rapidly and with as little friction as possible chemicals such as polymers are added to make the water "slick or slippery." Now when the well has been fractured and in order to keep the fissures or fractures propped open a proppant is added to maintain a crack in the fissure for the gas to flow from the formation to the well. This is similar to keeping a crack in a door open with a door stop. The proppant is normally added to the frac water.

There are several major "WATER" problems facing the US's most attractive Shale Gas Plays such as the Barnett Shale, the Haynesville/Bossier Shale, the Antrim Shale, the Fayetteville Shale and the New Albany Shale. One is the source of the frac water. First, many residents or opposing the use of drinking water purchased by operators from municipal drinking water treatment plants. In addition, many regulators, officials and citizens are opposing the potential drawdown of the two major drinking water sources, ground water and surface water, due to a combination of recent draughts and the large volumes of water necessary for fraccing a well.

A second problem arises after the well has been fracced with water. The water and many contaminants including but not limited to metals, sand, salts, carbonates, polymers, drilling fluids, acids and various hydrocarbons return to the surface commingled and often dissolved within the water and thus is referred to as "FRAC FLOWBACK." Gas may be produced and commingled with the frac flowback and is often flared until the well frac flowback water has ceased or reduced to the point that the well is said to be in "production." So the frac flowback can be referred to generally as contaminated produced water.

Many engineers, geologists, well fracturing service companies and gas companies believe that there are several major reasons for using fresh water as opposed to salt water for Frac Water. First, they strongly believe that the chemical Frac Package will not blend well with salt water. Second, many geologist and petroleum engineers believe that it is necessary to partially solution mine the gas shale formation with fresh water by producing brine in order to increase porosity of the formation.

However, other engineers, geologist, gas companies and service companies believe that a gas shale formation can be fracced by partially blending a treated frac flowback with a makeup water source which may be produced water containing salts from another well or fresh water containing a low level of chlorides that is recycled wastewater. Typically, a well will flowback about 20% to 60% of the water pumped downhole. Thus, by treating the frac flowback and recycling and reusing the clean frac flowback water, then this eliminates the disposal problems associated with frac flowback.

The makeup water or remaining 40% to 80% makeup water may be obtained from municipal and industrial wastewater treatment plants. There are two major concerns with recycling treated municipal wastewater effluent. The first major concern with operators is the liability of using this water that may contain both biological and chemical contaminants. Thus, a technology may be needed to remove these contaminants to a safe level as determined by regulators and operators. The second concern may be the location of the treated wastewater effluent and the transportation logistics and costs related to either piping it to the well or using a satellite storage facility, barging the wastewater or trucking it directly to the well.

Likewise, the geographical locations of many shale plays are in close proximity to major metropolitan areas as well as valuable surface and ground water sources. Hence, Shale Gas developers are in dire need of technologies for recycling water, in particular frac flowback.

The flowback water cannot be directly reused until contaminants are reduced to a level suitable for reuse of the frac flowback as makeup frac water. In addition to high total dissolved solids (TDS) such as salts, the flowback water contains various contaminants, such as organic materials (bacteria present in the rock formation, and fracing chemicals), polymers (the friction reducers and cross-linked gels), residual hydrocarbons (trace oil, and volatile organic compounds such as benzene and toluene), and suspended solids (clay, iron oxides, and silica).

Although there are many water treatment technologies capable of removing the aforementioned contaminants, the major contaminants posing a treatment problem and preventing operators and service companies from recycling frac flowback are water based polymers such as guar and xanthane gum. The removal of these contaminants is a critical step for recycling frac flowback, whether with high TDS (salts) or flowing the fluid to a reverse osmosis system or evaporator for removal of TDS. In either case, the polymers must be removed to reduce plugging and fouling of equipment.

Many large service companies firmly believe that not only a step-change in water treatment is necessary, but a game changing technology is necessary in order to make shale gas sustainable. The current approaches in treating frac flowback and produced water via mechanical vapor recompression and reverse osmosis is neither a step-change nor game changing. These technologies are commonly employed in many other industries. Although the use of ozone produced in traditional manners, such as corona discharge, coupled with UV lamps or ultrasound to form an advanced oxidation system is a slight step-change it is not a game changing water treatment technology necessary to provide the impetus for operators to develop shale gas.

The frac flowback water treatment problem requires an out-of-the box thinking type technology that can handle virtually any type of oilfield water without plugging, fouling or the need for cleaning traditional UV lamp systems. In addition, employing corona discharge ozone generators requiring dry air or dry oxygen is another added expense.

The true impetus for sustainable gas shale would be a technology which can be used during drilling operations for treating drill cuttings, then utilized for disinfecting and treating frac water and then again used for treating frac flowback and finally when the drilling schedule is complete the same technology asset can be used for cracking methane to hydrogen and carbon or steam methane reforming to produce syngas with the goal of capturing and storing carbon ("CCS") for enhanced oil recovery or for the production of activated carbon from nutshell, wood chips or coal as well as reactivating carbon in the field. Furthermore, the technology must be capable of operating with and coupling to existing produced water treatment systems such as gas flotation cells, nutshell filters, and activated carbon vessels.

Gas flotation is one of the most efficient and widely accepted methods used in variety of industries where removal of solid or immiscible liquid phases is of interest. In particular, in the petroleum industry, the ever-increasing volume of associated water produced from the hydrocarbon reservoirs as a side product has become a major issue to be addressed by the producers. Environmental awareness and regulations are increasingly challenging the producers to achieve a high degree of purification in the treated water streams prior to discharge or re-injection. Gas flotation has proven one of the most efficient and economical polishing processes compared to other methods and available technologies. Simultaneously, the economical penalty for additional water treatment capacity and footprint of apparatus are major factors in budgeting and decision making for the producers.

Another water treatment technology commonly found in the oilfield is activated carbon. One of the major problems with using activated carbon offshore for deepwater production platforms is that once the carbon is spent, it must be transported to shore then to a facility for reactivating the spent carbon. Likewise, gas shale frac flowback requires removal of organics but activated carbon has not been a preferred solution because of the transportation logistics involved in reactivating or disposal of the spent carbon.

The ideal plasma system for treating produced water and frac flowback on both drilling rigs and production platforms found on land and offshore would be easy to install or adapt to existing water treatment system and very robust. In addition, the plasma torch must be easy to ignite, sustain and create a dense plasma under various environments found within the oilfield. In particular, the plasma torch must not use nor require any exotic or inert gases commonly used for plasma cutting such as argon for starting the plasma torch. It must start in a complete vacuum or in a wet and flooded condition.

Texas Instruments ("TI") teaches a method for igniting and sustaining a dense plasma in its U.S. Pat. No. 5,397,962 titled, "Source and method for generating high-density plasma with inductive power coupling" invented by Moslehi, Mehrdad M. (Dallas, Tex.) which issued on Mar. 14, 1995. Moslehi teaches, "Another important technical advantage of the present invention inheres in the fact that magnetic fields generated by the coil antenna sections can be made to rotate with respect to an axial static magnetic field, thus providing for a more uniform high-density plasmas." Moslehi does not disclose a means for inductively coupling to an electrical arc created by an AC or DC power supply connected to carbon electrodes.

Ignition of a plasma is unreliable in a typical inductively coupled plasma reactor because it is difficult to couple to the plasma an ignition voltage high enough to excite the plasma. Specifically, very low chamber pressures, typically about 0.5 milliTorr, are necessary to achieve high plasma density in the region adjacent the semiconductor substrate and to maximize anisotropy of the sputter etch, but the voltage necessary to ignite the plasma undesirably increases with decreasing chamber pressure. Unfortunately, in an inductively coupled plasma reactor the very low chamber pressure and the lack of capacitive coupling make it very difficult to ignite a plasma in the chamber. In FIG. 1 of Moslehi's '962 patent he discloses a graph of breakdown voltage required to ignite a plasma as a function of vacuum chamber pressure for a discharge length of about 1.0 cm. This graph indicates that the optimum pressure for plasma ignition is on the order of about 500 milliTorr, and that below 400 milliTorr the breakdown voltage increases very fast as pressure is reduced. At the low pressure (i.e., 0.5 milliTorr) required for argon sputter etching, the required breakdown voltage may be close to or even exceed the capacity of the RF power source of the induction coil, making plasma ignition unreliable. As a result, it may be necessary to make several attempts to ignite a plasma, greatly reducing the productivity of the plasma reactor.

FIG. 2 of the '962 patent illustrates an inductively coupled plasma reactor of the prior art useful for argon plasma sputter etch processing having a cylindrical induction coil 10 around a cylindrical quartz reactor chamber 20 and lid 30, one end 10a of the coil being connected to an RF source 40 through a suitable RF matching network and the other end 10b being grounded. Plasma ignition relies upon the electrical potential between the "hot" end 10a of the coil 10 and the nearest grounded conductor in the chamber, such as the wafer pedestal 35. Thus, the discharge length is the distance between the hot coil end 10a and the nearest surface of the wafer pedestal 35.

A conventional technique for meeting the power requirement for plasma ignition is to connect an auxiliary RF power source to the induction coil during plasma ignition, but this requires additional hardware and expense.

Another conventional technique is to temporarily raise the chamber pressure when igniting the plasma and then, after the plasma is ignited, quickly reduce the chamber pressure to the desired processing pressure. However, pumping down the chamber pressure after plasma ignition (e.g., from 10 milliTorr during ignition to 0.5 milliTorr after ignition) requires a significant amount of time, during which the etch process will be carried out at a higher than ideal pressure, thereby causing poor etch profiles. Also, the necessary time to pump down will adversely affect throughput of the etch reactor.

Yet another conventional approach is to temporarily increase capacitive coupling during ignition by applying RF power to the wafer pedestal. However, this tends to create a large spike in the D.C. bias on the wafer during plasma ignition, increasing the risk of wafer damage.

U.S. Pat. No. 4,918,031 discloses how to introduce a so-called Faraday shield between the entire induction coil 10 and the plasma in the reactor of FIG. 2 (discussed above) and apply a separate electrical power source to the Faraday shield in order to control the electrical potential of the plasma or to ground the Faraday shield in order to suppress capacitive coupling by shielding the plasma from electric fields. A disadvantage of this technique is that it either unduly increases capacitive coupling to the plasma if used to increase the plasma potential, thereby reducing the control over ion energy, or else, if grounded, it cuts off whatever capacitive coupling from the induction coil may exist, thereby making plasma ignition less reliable or more difficult.

U.S. Pat. No. RE29304, "Plasma light source for spectroscopic investigation" issued to Greenfield et. al on Jul. 12, 1977 discloses a means for plasma ignition by inserting a carbon rod into a RF field. For example column 5, lines 15 to 50 disclose "A carbon rod is introduced into the open end of the vessel 1 as far as the jet 9. The rod is heated by high frequency currents produced therein and heats the surrounding gas which is thus ionised sufficiently to initiate a stable plasma which forms an annulus owing to the "skin effect." The rod is withdrawn and the plasma is now maintained by the operation of high frequency eddy currents and capacitively induced currents resulting from the flow of current in the coil. Argon gas is fed into the injector inlet 8 at a rate of five liters per minute. The powder sample is placed in the drum 11, which is rotated by the motor 13 at a rate of about 500 r.p.m. The powder is drawn up the capillary tube 10 and sprayed through the low temperature central region of the plasma to form a tail flame at the open end of the tubular vessel 1. The spectrum of this flame may be analyzed using a suitable spectrometer.

The production of the plasma in annular form instead of a plasma ball and the directing of the substance along the axis of the plasma annulus provides a convenient way of bringing the substance into the tail flame region. The use of the tail flame of the plasma to burn the substance is advantageous in that the plasma temperature is frequently higher than is desirable for analysis and in that the temperature of the tail flame can be adjusted by varying the voltage applied across the coil. This flexibility is desirable in view of the fact that the optimum temperature for analysis varies from substance to substance, and the temperature variation is much greater than can be obtained with conventional flame sources, for example air/acetylene burners, and whilst D.C. or A.C. are systems will give higher temperatures than such burners they also produce sample contamination."

Greenfield et. al RE29304 specifically discloses removing the carbon rod in order to not contaminate a sample. He does not disclose nor is it obvious to leave the carbon rod within the torch and continuously feeding the carbon rod as a source of fuel. Nor does the patent disclose a second carbon electrode. Likewise, there is no disclosure nor mention of coupling the carbon rod to a DC power supply in order to form an arc for creating, sustaining and forming a dense plasma.

U.S. Pat. No. 6,291,938, issued to Jewitt et. al and published on Sep. 18, 2001 titled, "Methods and apparatus for igniting and sustaining inductively coupled plasma" relates to improved methods and apparatus for igniting and sustaining inductively coupled plasmas produced from radio frequency (RF) power for process operations.

Jewitt's '938 patent describes the problem inherit with RF ICP torches related to igniting and sustaining the plasma. It states, "RF plasma is extensively used in a wide variety of applications for carrying out process operations. For example, thermal plasmas can be used to promote chemical reactions because of the high temperatures of the thermal plasma. Alternatively, thermal plasmas are able to promote chemical reactions because of the ability of the energetic electrons to break chemical bonds and allow chemical reactions to occur that would proceed with difficulty under non-plasma conditions.

In other applications, RF power is used to produce non-thermal plasmas, also referred to as non-equilibrium plasmas. The manufacture of semiconductor devices is one area in which non-thermal plasmas are extensively used. During the manufacture of semiconductor devices, etch processes involving RF plasmas and deposition processes involving RF plasmas are used repeatedly during the fabrication process. One of the main benefits of using the non-thermal plasma is the ability of the non-thermal plasma to stimulate chemical reactions that would otherwise require temperatures that are too high for use in the fabrication of semiconductor devices.

RF non-thermal plasmas are also used in cleaning processes in manufacture of semiconductor devices. The non-thermal plasmas are commonly used to strip photoresist materials from semiconductor wafers as part of post etch wafer clean procedures. Resist material is stripped from the surface of the wafers by creating a non-thermal plasma in a gas containing oxidizing species such as oxygen and possibly halogen species that are capable of reacting with and volatilizing the resist material. In some applications, the non-thermal plasma is maintained at a position upstream of the wafer. Reactive species generated in the non-thermal plasma flow downstream and react with the wafer surface for the stripping process. Another cleaning process that uses non-thermal plasmas is the cleaning of reaction chambers used in semiconductor manufacturing.

RF plasmas have also been used for decomposition of chemical compounds that are hazardous or otherwise undesirable. Some of the compounds are highly refractory in nature and are difficult to decompose. Examples of compounds that have been decomposed or abated with plasmas include chlorofluorocarbons (CFC) and perfluorocompounds (PFC).

One frequently encountered problem with standard inductively coupled RF plasma systems is the difficulty of igniting and sustaining the plasma. Plasma ignition is unreliable because coupling an ignition voltage high enough to generate the energetic species needed to produce the plasma is difficult. The voltage required to generate the energetic species is frequently referred to as the breakdown voltage. The breakdown voltage for a gas depends upon a variety of factors. Two major factors are the pressure of the gas and the electronic properties of the gas such as the electronegativity of the gas and its plasma products. The absolute value of the magnitude of the breakdown voltage undergoes a minimum with respect to the pressure of the gas. Specifically, the magnitude of the breakdown voltage increases for plasma ignition at pressures higher or lower than the pressures at which the minimum breakdown voltage occurs. Consequently, igniting plasmas at very low pressures and at high pressures is difficult. The electronegativity of the gas affects the magnitude of the breakdown voltage so that the gas with higher electronegativity requires higher breakdown voltages at every pressure.

Unfortunately for standard inductively coupled plasma technology, the absence of strong electric fields and the absence of strong capacitive coupling make it difficult to overcome the plasma ignition problems resulting from gas pressure and gas electronegativity. At pressures that are too high or too low or for gases with high electronegativities, the required breakdown voltage may equal or exceed the capacity of the RF power source, making plasma ignition unreliable. As a result, it may be necessary to make several attempts to ignite the plasma, greatly reducing the productivity and efficiency of the plasma process. The unreliable plasma ignition can waste valuable process gases, can increase pollution problems, and can ruin valuable product In addition to the problem of igniting the plasma, there is also the problem of poor plasma stability. After the plasma has been ignited it is possible for the plasma to go out, i.e. become extinguished, because of changes in RF power delivery conditions. For instance, the plasma can go out while performing a process and cause the same unfortunate results that occur for unreliable plasma ignition.

Clearly, there are numerous applications requiring reliable and efficient methods and apparatus for igniting and sustaining inductively coupled RF plasmas. Unfortunately, typical methods and apparatus for old-style inductively coupled RF plasma systems have characteristics that are undesirable for some applications.

Without limiting the scope of the invention, its background is also described in connection with tangentially fired boilers. The U.S. Department of Energy's ("DOE") National Energy Technology Laboratory (NETL) has stated, "Since T-fired boilers make up 44 percent of the world's installed base and 41 percent of that of the United States, a technology solution for T-fired boilers is important to address both existing and new units . . . . Oxy-combustion is a promising, near-term technology for carbon capture from pulverized coal (PC) fired power plants. Oxy-combustion replaces combustion air with a mixture of oxygen and recycled flue gas, creating a high carbon dioxide ($CO_2$) content flue gas stream that can be more easily processed for sequestration or high purity product. For more than a decade, Alstom Power, Inc. and others have been actively working on various oxy-combustion-based $CO_2$ control technologies. In these projects, a large body of scientific information and knowledge has been accumulated, but product development and technology gaps exist. In particular, oxy-combustion characteristics in a tangentially fired (T-fired) boiler are not well understood. Furnace aerodynamics and mixing with T-firing is vastly different from swirl-stabilized, wall-fired burners that require different design considerations to optimize oxy-combustion."

Likewise, the DOE has defined Innovative Confinement Concepts as a broad-based, long-range research activity that specifically addresses approaches that could lead to the attractive and practical use of fusion power. Likewise, there are many other reasons for confining plasmas. Current plasma confinement uses range from as simple as plasma cutting torches to increasing the life of ordinary household lamps and light bulbs to waste processing. One of the reasons for confining a plasma is to protect the plasma facing material (PFM)—the vessel. Modern day plasma torches can produce plasma gas temperatures as high as 50,000° F. There is no material known to science that will remain a solid at plasma temperatures of 50,000° F. In fact, carbon has the highest known melting point of all solids. Thus, in order to use known materials as plasma facing components the plasma must be confined in such a manner that the PFM survives while retaining its shape and structural strength for a specified time period. However, as the DOE has noted confining plasma is the Holy Grail to fusion power. Plasma can be confined by several means. The two practical approaches are inertial confinement and magnetic confinement. Magnetic confinement couples a magnetic field to the plasma in order to confine it. On the other hand, inertial confinement uses the inertia of a rotating fluid in many cases the plasma itself to confine the plasma and keep it away from the walls of the vessel it is confined within. Hence, an inertia confined rotating plasma will obey the laws of conservation of angular momentum.

The true impetus for sustainable heavy oil, oil shale or oil sand production, carbon capture and $CO_2$ enhanced oil recovery would be a technology which can take the bottom of a barrel, petroleum coke produced from cokers in refineries and convert it at the wellhead into useable products. For example, a compact and portable technology which can convert coke into $CO_2$ or syngas (CO+hydrogen) or ($CO_2$+ Hydrogen), then separate the $CO_2$ from the hydrogen for injecting the $CO_2$ downhole for EOR purposes while using the hydrogen at the wellhead for upgrading heavy oil, while treating associated gases and water produced with the heavy oil would solve many upstream problems as well as downstream refinery problems.

The $CO_2$ enhanced oil recovery (EOR) problem requires an out-of-the box thinking type technology that can be deployed in virtually any type of upstream O&G operation such as deepwater offshore production platforms, SAGD oil sand production facilities or environmentally sensitive areas such as Alaska. The current approach in upgrading oil sand bitumen via large and expensive cokers is neither a stepchange nor game changing. In fact, the cost of currently designed upgraders has put many projects on hold due to low crude oil prices.

Without any doubt plasma could change those problems associated with production and treatment of oilfield waste, upgrading heavy oil, bitumen, kerogen, flaring associated gas and treating produced water from oil and gas wells. Likewise, plasma could be the one single impetus for sustainable coal fired plants with respect to emerging green house gas emission problems.

However, there have been five major drawbacks and/or concerns in using plasma for industrial applications such as gasifying, cracking or steam reforming coal, petcoke, heavy oil, oil sand, oil shale, cracking methane and/or converting biomass to biochar. The drawbacks are electrode life, heat rejection, plasma ignition, sustaining a plasma and plasma confinement. Without a doubt the number one problem that must be solved in using plasma for the aforementioned applications is confinement due to the extreme temperatures the plasma facing material or refractory must survive in order to bridge the gap between R&D and commercialization. Shutting down a reactor every other month for a turn around in order to reline the reactor or repair the refractory is not an option in many applications. Many plants must operate their reactors continuous duty between turnarounds which may be upwards of two years.

In addition, the second and third major drawbacks—electrode life and heat rejection—must be solved in order to make plasma a sustainable and widely accepted technology. Most plasma torches reject upwards of 30% of the rated torch power as heat into its cooling water. This is due primarily to heat loss due to cooling the electrodes. The electrodes are cooled in order to prolong the life of the electrode. In light of this there is not a single industrial application worldwide where a plasma torch has been operated 24/7 for more than a few thousand hours which equates to shutting down the torch to replace electrodes every other month. In addition, once the plasma is ignited it must be sustained similar to keeping the fire lit in any boiler, furnace, thermal oxidizer or engine. This has been a major issue with using inductively coupled plasma (ICP) torches. Thus, many large scale applications have utilized DC or AC electrode type plasma torches. Once again, the benefits of using an electrodeless torch, not having to worry about electrode life, are outweighed by the inability to sustain a plasma with an electrodeless ICP torch.

As a result, there is a need for a simple plasma torch design that uses consumable electrodes while recuperating the heat generated from the torch. Likewise, many energy companies, such as coal utilities and oil companies, believe that not only a step-change in plasma torches and their inherit capital and operating costs are necessary, but a game changing plasma reactor design is necessary in order to make plasma gasification a reality and sustainable. Likewise, the DOE and Universities are in dire need of a simple plasma reactor design for conducting plasma R&D such as confinement, rotation and testing plasma facing material.

In light of the above references, there exists need for a cost-effective apparatus for studying rotating plasmas as well as confining a plasma that can be used at the DOE and academia level as well at laboratories owned and operated by Industry ranging from Oil and Gas companies, Petrochem Companies, Chemical Companies, Pharmaceutical Companies, Utilities and other such companies that conduct research. In addition, with rising energy oil prices, global warming, and greenhouse gas emissions there exists a need for industrial application of a relative inexpensive plasma rotation method, system or apparatus that can be used to modify existing equipment, such as a tangentially fired boiler, honeycomb base (HCB) tank, column, fluidized bed combustor, or gasifier by means of one or more plasma modules.

SUMMARY OF THE INVENTION

There exists a need for treating frac flowback in order to remove and/or destroy the organic fraction within the flowback water so that it can be directly recycled or evaporated or further treated with a reverse osmosis system for reuse as frac water. The technology should be portable with a small footprint and electrically driven allowing for the reduction of carbon emissions. The ideal technology would also allow for treating diesel emissions as well as treating drill cuttings to achieve reduced or zero discharge at the pad. In addition, the ideal technology would be capable of carbon capture and storage in addition to distillation of produced water and/or evaporating the reject from reverse osmosis systems which are currently being employed for treating both frac flowback and produced water.

The present invention overcomes the difficulty of igniting and sustaining an inductively coupled plasma by use of a first plasma source—a Carbon Arc Hydrocyclone—to create an arc for sustaining and increasing the plasma density by induction coupling while also providing a means for treating both conventional and unconventional E&P waste such as produced water and frac flowback, while also providing a means for treating solid waste such as spent carbon, drill cuttings, spent lime and oily sludges.

The present invention provides a system, method and apparatus for igniting, sustaining and forming dense plasma. The present invention provides a means of inductively coupling a carbon arc plasma to a radio frequency field. In addition, the present invention provides a means for treating upstream oil and gas waste streams with plasma and other forms of wave energy.

The present invention relates to a research and development plasma whirl module for designing full scale plasma whirl reactor modules for retrofitting existing triangular, square, rectangular, round, donut, cone and/or generally cylindrical shaped reactors. Likewise, the present invention relates to a means to create, sustain and confine a very dense and high temperature plasma core utilizing corpuscular radiation, for example electrons or an electrical arc, and/or electromagnetic radiation, for example, radio frequency or microwaves, as another plasma source in combination with the three or more plasma torches. Likewise, the present invention overcomes a key obstacle, plasma confinement, by protecting the plasma facing material via a unique approach—tangentially firing three or more torches to confine and rotate the plasma plume exiting from each torch.

The present invention's approach for tangentially firing three or more torches has led to numerous unexpected results allowing for the construction of an inexpensive research and development plasma module for use at universities, industrial research labs as well as for scaling up to a full size commercial Plasma Whirl® Reactor. More importantly, for industrial applications as opposed to R&D the present invention allows for rapidly retrofitting existing tangentially fired boilers into tangentially fired plasma whirl reactors, which by its inherit design confines the plasma ball formed within the boiler. Also, this allows for conversion of one or more tangentially fired boilers into a Plasma Whirl® gasifier, while precapturing carbon prior to combustion in the existing boilers or adding high efficiency gas turbine generators.

In addition, electrode life is no longer a concern by utilizing a novel inductively coupled carbon arc torch which continually feeds a sacrificial electrode/conductor. And by utilizing cooling water as the gas source for the torch the efficiencies increase dramatically especially when operated in a steam reforming mode. By using the ArcWhirl® Torch (U.S. Pat. No. 7,422,695) or Solid Oxide Cell coupled to the ArcWhirl®, the Plasma Whirl® Reactor may be operated as a dual treatment system coupling water treatment with any one of the following modes of operation occurring with the Plasma Whirl® Reactor: methane, ethane, butane, propane or light end cracking mode, gasification mode, thermal oxidation mode, high temperature oxycombustion mode, steam reforming mode or for various applications for continuous duty operations as will be described herein.

Various embodiments of the present invention can be used for retrofitting existing equipment or constructing a reactor such as a gasifier for gasification of fossil fuels such as coal, petroleum coke, oil sand, oil shale, heavy oil while also treating waste from oil and gas wells or refineries such as frac flowback, produced water, wastewater, tank bottoms, sludge, etc. Likewise, the present invention provides a means for cracking natural gas into hydrogen and carbon with a means for separating the carbon from the hydrogen for a combined carbon capture and sequestration system. Furthermore, the present invention a means for producing biochar from biomass while separating the biochar from the gases, thus enhancing carbon capture. The present invention is well suited for treating sticky or slimy materials which are difficult to convey such as biosolids, drill cuttings, waste polymers, sludge, refinery tank bottoms and skims from flotation cell such as induced gas flotation cells commonly employed for treating produced water from oil and gas wells, dissolved air flotation (DAF) tanks used for treating industrial wastewater and protein skimmers commonly found in the aquaculture industry.

In particular, the present invention relates to plasma treating, in particular, plasma steam reforming of carbon based material, for example fossil fuels such as coal, petroleum coke, graphite, heavy crude oil, oil sand, oil shale, natural gas and casinghead gas, and biomass such as biogas, biosolids, animal manure, woodchips, nutshell, activated carbon, leaves, black liquor, sugarcane, and municipal solid waste. In particular, the present invention relates to utilizing a plasma whirl reactor for carbon capture and storage (CCS), $CO_2$ enhanced oil recovery and/or treating solids, liquids and gases produced from upstream oil & gas exploration and production activities. In addition, the present invention relates to a tangentially fired oxycombustion plasma whirl reactor.

The present invention, which will be described in detail below, provides a means for studying rotating plasmas. As a result, the pervasive prior art problem of absorbance or path length of wave energy through the fluid is overcome by the present invention. A significant, and novel, focus of the present invention is in the treatment of liquids with wave energy generated by a carbon arc, but the novelty of the invention is not limited to the carbon arc treatment approach. In addition, the present invention provides a means for treating matter with several forms of wave energy, including ultrasound. Without limiting the scope of the invention or the purposes for which the invention may be advantageously used, the present invention may be generally described as encompassing a method, apparatus, and means of constructing such apparatus, for treating a liquid subject to wave energy absorbance within a whirlpool, wherein several forms of wave energy are combined synergistically within the conduit to effectively treat the fluid.

The present invention provides a device for treating fluids which is capable of subjecting the liquid to several forms of wave energy. In addition, the present invention provides a device for treating liquids with wave energy at wavelengths, focus, intensity and residence times that is superior to prior methods. Moreover, the present invention provides a wave energy apparatus that utilizes the conservation of angular momentum to first form a whirling fluid that increases in velocity, then expands outwardly to form a thin film upside down whirlpool or funnel, generally shaped in the form of an umbrella or parabolic reflector. In addition, the present invention provides a photochemical reactor apparatus that is superior to photochemical reactors known in the prior art, a wave energy reactor which installs easily into existing structures, and a method, which overcomes residence time and absorbance phenomena associated with photochemical reactions.

The present invention provides a plasma system that includes a plasma arc torch, a cylindrical tube and an eductor. The plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. The cylindrical tube is attached to the hollow electrode nozzle and aligned with the longitudinal axis, the cylindrical tube having a side inlet and a radio frequency coil disposed around or embedded within the cylindrical tube. The eductor is attached to the cylindrical tube and aligned with the longitudinal axis.

The present invention provides a plasma system that includes three or more plasma arc torch modules aligned with one another to form a confined plasma whirl. Each plasma arc torch modules includes plasma arc torch, a cylindrical tube and an eductor. The plasma arc torch includes a cylindrical vessel having a first end and a second end, a first tangential inlet/outlet connected to or proximate to the first end, a second tangential inlet/outlet connected to or proximate to the second end, an electrode housing connected to the first end of the cylindrical vessel such that a first electrode is (a) aligned with a longitudinal axis of the cylindrical vessel, and (b) extends into the cylindrical vessel, and a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel. The cylindrical tube is attached to the hollow electrode nozzle and aligned with the longitudinal axis, the cylindrical tube having a side inlet and a radio frequency coil disposed around or embedded within the cylindrical tube. The eductor is attached to the cylindrical tube and aligned with the longitudinal axis.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 1 discloses one embodiment of the present invention that shows an inductively coupled plasma carbon ArcWhirl®;

FIG. 2 discloses one embodiment of the present invention that shows an inductively coupled plasma ArcWhirl® Torch;

FIG. 3 discloses one embodiment of the present invention that shows an inductively coupled ArcWhirl® Reactor Modules;

FIG. 4 discloses one embodiment of the present invention that shows an inductively coupled plasma ArcWhirl® Reactor;

FIG. 5 discloses one embodiment of the present invention that shows an inductively coupled plasma ArcWhirl® Gas Sparger;

FIG. 6 discloses one embodiment of the present invention that shows an inductively coupled plasma ArcWhirl® Eductor;

FIG. 7 discloses one embodiment of the present invention that shows an inductively coupled plasma ArcWhirl® Eductor Recuperator;

FIG. 8 discloses one embodiment of the present invention that shows an inductively coupled plasma ArcWhirl® Eductor attached to a Gas Flotation Cell;

FIG. 9 discloses one embodiment of the present invention that shows an inductively coupled plasma ArcWhirl® coupled to a Honey Comb Base Tank;

FIG. 10 discloses one embodiment of the present invention that shows an inductively coupled plasma ArcWhirl® attached to a Honey Comb Base Tank converted to an Activated Carbon System;

FIG. 11 discloses one embodiment of the present invention that shows three plasma torches aligned in a triangle shaped PlasmaWhirl®;

FIG. 12 discloses one embodiment of the present invention shows three ArcWhirl® Torches aligned in a triangle shaped PlasmaWhirl®;

FIG. 13 discloses one embodiment of the present invention that shows a R&D tangentially fired PlasmaWhirl® Reactor Module;

FIG. 14 discloses one embodiment of the present invention that shows a R&D robotic tangentially fired PlasmaWhirl® Reactor Module;

FIG. 15 discloses one embodiment of the present invention that shows a tangentially fired PlasmaWhirl® Reactor with a Recuperative Plasma ArcWhirl® Torch;

FIG. 16 discloses one embodiment of the present invention that shows a Linear Tube Plasma Whirl® Module which pivots for yaw alignment;

FIG. 17 discloses one embodiment of the present invention that shows a Plasma Whirl® Reactor with fixed ICP ArcWhirl® Torches;

FIG. 18 discloses one embodiment of the present invention that shows a Sextant Plasma Whirl® Module;

FIG. 19 discloses one embodiment of the present invention that shows a Sextant Plasma Whirl® Module with various yaw angles;

FIG. 20 discloses one embodiment of the present invention that shows a Sextant Plasma Whirl® Module;

FIG. 21 discloses one embodiment of the present invention that shows a 3 dimensional Plasma Whirl® Pancake Module;

FIG. 22 discloses one embodiment of the present invention that shows multiple stacked Plasma Whirl® Pancake Modules;

FIG. 23 discloses one embodiment of the present invention that shows an ArcWhirl® retrofitted with a Plasma Whirl® Module;

FIG. 24 discloses one embodiment of the present invention that shows a Honey Comb Base® Tank retrofitted with a Plasma Whirl® Module;

FIG. 25 discloses one embodiment of the present invention that shows a pipe inserted into a Plasma Whirl® Module in which the PWM cuts, welds or plasma coats the pipe;

FIG. 26 discloses one embodiment of the present invention that shows an Induction Furnace retrofitted with a Plasma Whirl® Module;

FIG. 27 discloses one embodiment of the present invention that shows a Rotary Kiln retrofitted with Plasma Whirl® Modules;

FIG. 28 discloses one embodiment of the present invention that shows a Cyclone Separator retrofitted with a Plasma Whirl® Module;

FIG. 29 discloses one embodiment of the present invention that shows a Gas Turbine Engine retrofitted with a Plasma Whirl® Module Augmenter;

FIG. 30 discloses one embodiment of the present invention that shows a Tokamak Fusion Reactor retrofitted with Plasma Whirl® Modules;

FIG. 31 discloses one embodiment of the present invention that shows a four torch Plasma Whirl® Reactor; and FIG. 32 discloses one embodiment of the present invention that shows a three torch AC DC ArcWhirl® Reactor System.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention provides a system, method and apparatus for igniting, sustaining and forming dense plasma. The present invention provides a means of inductively coupling a carbon arc plasma to a radio frequency field. In addition, the present invention provides a means for treating upstream oil and gas waste streams with plasma and other forms of wave energy.

Turning now to FIG. 1, one embodiment of the present invention discloses an inductively coupled plasma ("ICP") ArcWhirl® Cyclone 10 that includes carbon electrodes 11 and 12 electrically connected to a DC power supply (not shown). When either electrode 11 or 12 is moved to touch the other electrode a dead short is formed and when pulled back and an arc 13 is formed between electrodes 11 and 12. A thin film of fluid as shown by arrow A is flowed in a whirl, swirl or vortex around the electrodes. The fluid is treated with several forms of wave energy irradiating from the plasma including but not limited to UV, IR, electrons, cations, and anions in addition to chemicals that may be formed in situ such as atomic oxygen, ozone, hydroxyl radicals and hydrogen peroxide if oxygen or air is present within the fluid. In addition, since the carbon will sublime from the electrodes 11 and 12 then carbon monoxide or carbon dioxide may form for use in carbonating the fluid or for example using carbon monoxide as a reducing agent. Next the plasma volume is dramatically increased by coupling the plasma arc or the graphite (carbon) electrode or both with a radio frequency selected from a predetermined frequency by energizing a RF Coil 14.

Not being bound by theory it is believed that if the fluid contains total dissolved solids ("TDS") such as electrolytes, for example, salts, polyelectrolytes, dissolved metals, cations and anions, in addition to carbon or graphite then the RF field may couple to the TDS and carbon, which may enhance treating of the fluid. This would be similar to an induction furnace coupling to a metal or graphite in order to melt the metal or heat the graphite crucible. Likewise, salts in a fluid would act similar to an induction salt bath.

Turning to FIG. 2, one embodiment of the present invention discloses an ArcWhirl® Cyclone 10 with an RF Coil 14. Carbon electrode 12 is a hollow electrode or graphite tube. It will be understood that other electrically conductively materials such as tungsten carbide (WC), copper or aluminum may be used in lieu of carbon. The hollow electrode 12 actually operates as a vortex finder in the Cyclone 10. The fluid to be treated enters into a tangential inlet 15 which is and creates a whirling thin film then exits via a tangential outlet 16. The cyclone's 10 cylinder housing or parts thereof are constructed of an RF permeable material 17 and is surrounded by the RF coil 14.

The following example will illustrate how the present invention can ignite, sustain and form a dense plasma for use in chemical reactions such as treating, heating, melting, vitrifying, gasifying, cracking, oxidizing, reducing, combustion, sintering, welding and cutting solids, liquids or gases.

Example 1

Returning to FIG. 2, fluid is flowed into the ArcWhirl Torch via inlet 15 and exits via outlet 16. A vortex will be formed with the center of the vortex operating at a slight vacuum. Since the ICP torch is open to the atmosphere then air will be drawn into the torch through the hollow electrode 12. It will be understood that a gas, such as air, oxygen, methane, diesel emissions and carbon dioxide for example can be introduced into the ICP ArcWhirl® torch in combination with the fluid via inlet 15.

The ICP ArcWhirl® Torch is ignited by first moving electrode 11 to touch the carbon vortex finder electrode 12. It is understood that one of the electrodes either 11 or 12 will be the cathode and the other will be the anode and accordingly electrically connected to a DC power supply. The DC power supply (not shown) is then turned on and a dead short is formed between electrodes 11 and 12. Next, electrode 11 is moved away from electrode 12 by means known in the art such as a linear actuator (not shown). The arc 13 is formed between electrodes 11 and 12. A plasma is blown out of the hollow electrode 12.

Unexpected Results

The torch was operated with steam produced from an electric glow discharge plasma system and a plasma continued to be discharged from the electrode nozzle 12 even when the power supply to the ArcWhirl® Torch was turned off. An air ejector (not shown) was attached to fluid inlet 15 in order to pull a vacuum on the electric glow discharge plasma system. Steam and other gases were flowed into the ArcWhirl® Torch 10. A valve (not shown) connected to the discharge outlet 16 was slowly closed and all of the fluids were flowed through the electrode nozzle 12. Not being bound by theory it is believed that the steam reacted with the carbon to form hydrogen and carbon monoxide. The air reacted with the mixture of carbon, hydrogen and carbon monoxide both internally and also when it exited the ArcWhirl® Torch to form a very lean orange colored flame. Next the system was operated without the air ejector and only steam and other gases were flowed in the ArcWhirl® 10. A very blue and intense white plasma exited from the ArcWhirl® Torch even when the power was turned off from the DC power supply.

This gives rise to a method for operating a plasma torch. It is well known that the water gas shift reaction or the reaction between carbon and steam is slightly exothermic. Thus, by using carbon or graphite rods, the rods act as a both a fuel source and an electrode. Consequently, the electrical power can be decreased while allowing the torch to operate in an extremely efficient means for generating syngas. In addition, it is believed that the ArcWhirl® Torch can be operated at a gas well to produce hydrogen and carbon from natural gas. This will be demonstrated in the next example.

Example 2

Referring again to FIG. 2, the RF coil assembly 14 is placed around the ArcWhirl® Torch 10. This now converts the ArcWhirl® into an Inductively Coupled Plasma Torch. By selecting the proper frequency either or both of the carbon rods or the plasma can be coupled to the electrical field created by the radio frequency. Natural Gas from the well is flowed directly into fluid inlet 15. The ICP ArcWhirl® Torch 10 is ignited by dead shorting the carbon rods then pulling them back. The vortex created by the natural gas confines the plasma arc using inertia. Next, the RF coil 14 is turned on which increases the plasma volume. As the natural gas cracks into carbon and hydrogen the carbon will continue heating due to the RF field. This ensures that all of the natural gas is cracked into hydrogen and carbon.

Since the ArcWhirl® is a cyclone separator it can be configured and modified by means known in the art to separate the hydrogen from the carbon. This new means of generating hydrogen at the wellhead allows for zero emissions when coupled to a fuel cell or zero $CO_2$ emissions when the hydrogen is burned in an internal combustion engine or a boiler. This dramatically reduces the carbon footprint for producing natural gas. The efficiency of the ICP ArcWhirl® Cracker can be increased by coupling the hot plasma exhaust to an organic rankine cycle (ORC) or to a stirling engine.

Example 3

Turning now to FIG. 3, the ICP ArcWhirl® 10 Reactor can easily be assembled in modules. A standard ArcWhirl® Torch as disclosed in U.S. Pat. Nos. 7,422,695 and 7,578,937 and U.S. Published Patent Application No. US20090235637, entitled, "SYSTEM, METHOD AND APPARATUS FOR LEAN COMBUSTION WITH PLASMA FROM AN ELECTRICAL ARC" is the first module. It is attached by means know in the art to the RF Coil Module 14. The RF Coil Module 14 includes one or more slits or inlets 17 to introduce a material such as a solid, liquid or gas for treatment purposes. This configuration allows for treating of two separate materials with one apparatus.

This modular system allows for a compact and easy to assemble plasma chemical reactor for treating two separate materials comprising: a vessel 14 having an interior defined by a cylindrical portion disposed between a first end and a second end, an outlet in said second end that is aligned with a longitudinal axis of the cylindrical portion, and an inlet in said cylindrical portion to receive a material; a first plasma source comprising a carbon arc plasma torch 10 with a material inlet 15 and a material outlet 16 connected to the first end and aligned with said longitudinal axis of said cylindrical portion to introduce a plasma into said interior; a second plasma source comprising a set of radio frequency coils disposed around or within said cylindrical portion to add energy to said plasma, and two or more jets or slits 17 within said cylindrical portion to direct a fluid or a gas into said interior to create angular momentum in said plasma to form a plasma vortex that circulates around said longitudinal axis; and wherein said plasma vortex reacts with said material to create comminution, separation, chemical conversion or a combination thereof.

Example 4

Turning now to FIG. 4, the ICP ArcWhirl® 10 Induction Furnace is operated in a reverse plasma mode. That is the material to be treated is conveyed into inlet 17. The material is fully melted or treated and the slag or material is removed via outlet 18. ArcWhirl® Torch module 10 is shown coupled to the RF Coil Induction Furnace Module 14 to operate as one system. Any off gases produced from the melted material go up and overhead into the ArcWhirl® 10 via nozzle electrode 12. The off gases are treated with both the plasma arc and the fluid introduced into the ArcWhirl® via inlet 15. The gases and fluid exit via outlet 16.

The ICP ArcWhirl® Induction Furnace may be operated in the following manner in order to bring the material to a rapid melt or for rapid reactivating carbon. A gas can be introduced into inlet 15. Outlet 16 is partially closed so that the plasma must enter into the RF Coil Module 17. The plasma will exit via outlet 18 and be recirculated into inlet 15. This allows for rapid heating of the charge material added to the RF Coil module 14.

This modular system allows for a compact and easy to assemble plasma induction furnace for melting materials comprising: a thermal energy treating system comprising a vessel having an interior defined by a cylindrical portion disposed between a first end and a second end, an outlet in said first end that is aligned with a longitudinal axis of the cylindrical portion, and at least one inlet in said cylindrical portion to receive a waste material; a plasma system comprising a set of radio frequency coils disposed around or within said cylindrical portion to generate a plasma within said interior, and two or more jets mounted tangentially in said cylindrical portion to direct a fluid or a gas into said interior to create angular momentum in said plasma to form a plasma vortex that circulates around a central void substantially aligned with said longitudinal axis; and wherein said plasma vortex reacts with said waste material to create comminution, separation, chemical conversion or a combination thereof.

Example 5

Turning now to FIG. 5, the ICP ArcWhirl® 10 Gas Sparger allows for stripping contaminants from a fluid as disclosed in U.S. Pat. No. 7,422,695. However, the stripped contaminants and the stripping gas exit the ArcWhirl® 10 via electrode nozzle 12 and are flowed into the RF Coil Module.

A second material to be treated can be added via material inlet 17. Thus, the stripping gas and contaminants are converted to a plasma for treating a second material. What is unique about this configuration is that in the past, operating just the Arcwhirl® 10 with a liquid and gas, sometimes the liquid exited electrode nozzle 12 as a liquid. The RF Coil 14 serves two purposes. First, the RF field will couple to the graphite nozzle 12. The graphite can be heated to ensure that any fluids exiting the nozzle 12 are in a gas state. Next, this will enhance coupling to the plasma and forming a very dense plasma within the RF Module 14 and also exiting via its outlet 18.

Example 6

Turning now to FIG. 6, the ICP ArcWhirl® 10 Eductor is easily assembled with three modules. The ArcWhirl® 10 is attached to the RF Coil Module 14 which is attached to an Eductor 20. The ideal eductor 20 for use in the present invention is known as the Peri-Jet® Eductor and is manufactured by Derbyshire Manufactures of Philadelphia, Pa., USA. The eductor 20 serves several purposes. First, it pulls a vacuum on the ICP ArcWhirl® Torch by flowing a fluid into eductor 20 inlet 21. This allows material to enter the RF Module via inlet 17 by means of a vacuum suction. Thus, material can be pneumatically conveyed via vacuum into the ICP ArcWhirl® Torch. Second, the eductor 20 can be used to fast quench reactions and products formed within the PlasmaWhirl® reactor. Third, the eductor 20 can be used to pressurize the commingled plasma gases and reactants with the driving fluid from the eductor.

For example, oxygen can be fed into the ICP ArcWhirl® Torch and converted into atomic oxygen and ozone. The atomic oxygen and ozone are educted into a liquid and rapidly mixed with the liquid and pressurized to enhance solubility of the gas. This plasma mass transfer method allows for a compact and robust method for operation as a wet air oxidation system.

In the event the ICP ArcWhirl Torch® is attached to a thermal oxidizer then a cooling recuperator jacket can be added to the ejector as shown in FIG. 7. Thus, combustion air entering into the recuperator allows for cooling the ejector while preheating the combustion air. This unique thermal oxidizer is a gasifier combined with an oxidizer. Any organic laden material is first gasified in the RF Module 14 by means of the large and dense plasma exiting from the ArcWhirl® coupled to the RF Field. Once again the RF Module 14 can be configured to allow only a gas to exit into the ejector 20 by using a tap hole for slag to exit the reactor as shown in FIG. 4. On the other hand, all material entering into the RF Module 14 can be entrained into the ejector.

Example 7

Produced Water and Frac Flowback—Fenton's Reaction

As previously stated there exists a need for treating flowback water and produced water from oil and gas operations. The ICP ArcWhirl® Eductor as shown in FIG. 6 can be coupled to an induced gas flotation (IGF) cell, dissolved air flotation (DAF) system or froth flotation system. Referring to FIG. 8, produced water or frac flowback can be flowed into the eductor 20 of the ICP ArcWhirl® Eductor which then discharges into a float cell. Any gas can be flowed into the ICP ArcWhirl® Torch in order to strip soluble contaminants such as guar and xanathane gum for destruction within the dense plasma core. The water exits the cell and is flowed into the ArcWhirl® and exposed to cavitation, UV light, IR, electrons and various other forms of wave energy.

Although the flow diagram in FIG. 7 shows the produced water influent entering into the eductor and finally discharging and exiting from the system via the ArcWhirl® it will be understood that the flow can be reversed in that the produced water first enters into the ArcWhirl®, then into the cell and it pumped up into the eductor 20, where it is finally discharged from the cell via an exit (not shown).

The produced water and/or frac flowback is exposed to several forms of wave energy in addition to various chemicals generated in situ. For example, not being bound by theory, it is believed that if iron (Fe) powder is flowed as the material into the RF Module 14, then the iron will go into solution and react with any oxidants formed within the plasma to generate hydroxyl radicals via the Fenton Reaction. It is well known that Fenton's Reagent is a very powerful method for oxidation of organics in water.

During operation of an ArcWhirl® attached to a tank and placed on recirculation, every time the ArcWhirl® was operated with organic laden water which contained dissolved iron, the organics completely separated out and an iron precipitate was formed and settled to the bottom of the cell. The water was crystal clear and free of any oil sheen.

Example 8

Turning to FIG. 9, one embodiment of the present invention discloses an ICP ArcWhirl® Eductor coupled to a Honey Comb Base ("HCB") Tank. The HCB Tank is an ideal tank for storing and conveying drill cuttings from oil and gas drilling operations. The HCB Tank is patent pending under U.S. Published Patent Application No. US20090010719 by Ronald George Morris of Montrose (GB).

It is well known that most thermal desorption methods utilized for drill cuttings will only reduce the retention on cuttings ("ROC") to less than 1%. Many service companies and operators firmly believe that this is sufficient. However, as previously stated, for Shale Gas development to be sustainable, then the drill cuttings must be treated to an inert stage.

It is well known that plasma can melt drill cuttings and produce an inert slag. By coupling the ICP ArcWhirl® Torch to a pneumatic conveying system as shown in FIG. 9, the system can treat drill water and/or frac makeup water while simultaneously melting the drill cuttings. Thus, when drilling is complete, the frac water will be ready for fracturing and the only solid material left will be an inert slag. Thus, the pad will be left in an environmentally clean state and this method for treating drill cuttings may also eliminate another environmentally sensitive problem—closure of pits. Drilling fluids can be stored in roll-off type containers and the excavation of one or more pits for storage of cuttings is not necessary if the cuttings are stored in HCB Tanks then treated with the ICP ArcWhirl® Torch.

Example 9

Producing and Reactivating Carbon Onsite with Plasma

Activated carbon and nutshell are commonly used on offshore production platforms for removal of organics from produced water. When the activated carbon is spent it is transported to shore and sent to an activated carbon plant to be reactivated. It is quite obvious that an immediate need exists for reactivating the carbon onsite.

Likewise, if a small portable plasma system could be coupled to a carbon vessel that allows for easy removal of the carbon onsite, then this opens the door to not only treating produced water, but also treating frac flowback. Once again Halliburton's patent pending HCB Tank and its patented SupaVac™ SV400 unit which is a compact, air-operated, vacuum recovery and pressure discharge pump would appear to make an ideal activated carbon filter system.

When coupled with the ICP ArcWhirl® Eductor as shown in FIG. 10 this allows for reactivating the carbon onsite. The HCB Tank gate valves 38 would be replaced with a filter gate valve that would allow water to flow through but not the activated carbon. The ArcWhirl® module may be operated continuously in order to polish or disinfect the water with UV light in addition to generating ozone. It is well known that ozone and activated carbon can be operated in an advanced oxidation mode. Thus, by piping the activated carbon vessels in series, the ozone generated by one ArcWhirl® ICP can be flowed to the next carbon filter. Likewise, for destruction of ozone a second advanced oxidation method can be used to polish the water. Simply, using the UV light from the ArcWhirl® to activate the ozone and convert it to hydroxyl radicals. This can be accomplished by flowing the produced water through the ArcWhirl® module of the ICP ArcWhirl® Eductor.

Charcoal and reactivated carbon has been created by flowing the carbonaceous material into the discharge of an ArcWhirl® which was discharged into a cyclone separator.

Resident times were less than a second. Thus, in order to reactivate carbon onsite, an operator would simply turn on the RF Module 14 open the filter screen gate valve and allow the spent carbon to flow into the ICP ArcWhirl® Eductor via material inlet 17 as shown in FIG. 6. Air or water may be used as the motive fluid for the eductor 20. As previously stated, the plasma exiting from nozzle 12 will aid in reactivating the carbon, while the RF field will couple to the plasma, the nozzle and the carbon thus enhancing removal of contaminants from the surface of the spent carbon. The reactivated carbon is then conveyed to an empty HCB Tank.

This method eliminates the cost associated with handling, transporting, disposing or reactivating carbon. Thus, it opens the door for a cost effective and proven method for treating water using activated carbon coupled with UV light and ozone all of which are provided by a novel ICP ArcWhirl® Torch.

Heretofore, in this field, plasma rotation will mean plasma whirl, plasma swirl, tangential fired plasma, plasma vortex or any plasma with angular momentum. Likewise, the term plasma whirl is defined herein as plasma rotation or a plasma with angular momentum.

Self-Confining Plasma

The present invention also provides a system, method and apparatus for igniting, sustaining and forming dense plasma with a means for confining the dense plasma. The present invention provides a research and development means for designing and then retrofitting existing equipment with a Plasma Whirl® module. Likewise, the present invention provides a means for studying high temperature destructive rotating flames found in wild fires such as firewhirls. In addition, the present invention provides a means for carbon capture and storage via gasification of organic matter with a rotating plasma.

Turning now to FIG. 11, one embodiment of the present invention discloses three plasma torches 100 aligned horizontally in a first geometric shaped reactor 110, such as a triangle, in order for each torch's plasma plume 120 to tangentially intersect an imaginary or real (vortex finder, carbon electrode, carbon arc, electron beam, etc.) second geometric shape 130 within the center of the first geometric shape 120. The plasma plume 120 of one torch 100 will intersect with the plasma plume of another torch at a point 140, such that the velocity of one plume is greater than the other, hence it turns the plasma inwards and causes rotation 150 about a central vertical axis 160. The benefit of this novel configuration is that it keeps the plasma off and away from the plasma facing material (PFM) 170.

Electron Beam Reactor

What is completely unexpected about the PlasmaWhirl® Reactor is that the plasma torches may be replaced with a different type of plasma source—an electron beam welder (EBW). There are two types of Electron Beam Welders—vacuum and non-vacuum. Vacuum EBWs operate within a sealed chamber under a very high vacuum. A non-vacuum electron beam welder (NVEBW) is attached to a vacuum pump that pumps down the electron beam gun to a high vacuum and the electron beam is irradiated from the gun via a very small orifice.

Not being bound by theory it is believed that the plasma torches 100 as shown in FIG. 11 can be replaced with electron beam welders or guns. A very inexpensive electron beam gun can be removed from older cathode ray tube type TVs or displays. Referring to FIG. 11 the electron beam 120 would attempt to intersect at point 140 another electron beam. However, since electrons are negatively charged, then the first electron stream would be pushed away from the second electron stream. There are two methods to ensure that the electron beams would go to the center 160 and cause rotation 150. First a positive anode could be placed along the central vertical axis 150 such as a carbon rod or any other electrically conductive material. Second magnets could be placed along the outside of the reactor 110 in order to squeeze the electrons towards the center to create a very high density plasma if any molecules are present within the reactor 110.

Sintering Ceramics

This approach leads to a very novel and extremely fast method for sintering ceramics, specifically sintering ceramic proppants, which are used in oil and gas wells to "PROP" open the fissures after hydraulically fracturing a well. Two novel methods will be disclosed for both sintering and treating green ceramics.

First, the ceramic proppant may be pretreated with an anionic material thus giving it a positive (+) charge. This will allow the electrons to react with the positive charges.

The second method is simply to bombard the ceramic matrix with anions from an anion gun. Or quite simply the ceramic proppant can be preheated and oxidized in an oxidizing rotary kiln.

Next, whether the first or second pretreatment method is used, the green ceramic is flowed into the reactor 110 directly into the vortex 130 of the Plasma Whirl® reactor 110. The green ceramic will absorb and gain the high velocity electrons and thus be reduced in accordance with standard redox reactions—reduction is a gain of electrons. The sintered ceramic will then flow downwardly along the vertical axis 160 into a cone. The cone allows the ceramic proppant to swirl along the walls of the reactor at extremely high G-forces, thus causing the proppant to densify and become spheriodial in shape. The purpose of the cone is to conserve angular momentum and cause the proppant to move faster and faster to increase the G-force on the proppant. The sintered ceramic would then exit from the bottom (not shown) of the Plasma Whirl® Reactor.

Recycling and Reclaiming Waste Electronics—Cathode Ray Tubes

The present invention gives rise to a novel use for a growing concern—TV's with cathode ray tubes. Traditional style TV's and computer monitors using cathode ray tubes have been replaced with LCD screens and plasma displays. The vast number of older style TV's and monitors stored in closets, warehouses and/or building is staggering and is creating a huge environmental problem. In part, the present invention solves the problem by not having to destroy the electron gun within the TV's. Simply removing the electron gun and using it as described and shown in FIG. 11, allows for construction of an inexpensive PlasmaWhirl® Reactor. Likewise, the remaining plastics, glass and metals can be processed in the PlasmaWhirl® Reactor for recovery of valuable resources. This completely eliminates landfilling a valuable resource—old TV's and monitors.

In addition, the apparatus and method as disclosed for constructing an Electron Beam Plasma Whirl® Reactor from old TV electron guns opens the door for many high schools, universities and laboratories to afford and own an apparatus for studying electron beams and rotating plasmas. Likewise, it opens the door for conducting batch sintering of ceramics and metals with a bench size electron beam Plasma Whirl® reactor.

Referring to FIG. 12, it will be understood that plasma torches, such as the Inductively Coupled Plasma ArcWhirl® torch may be utilized in lieu of electron guns to carry out the sintering process as disclosed in the above description. In this case, the gases for the plasma torch may be selected from either reducing or oxidizing type gases such as hydrogen or oxygen in order to fully sinter and densify the green ceramic. Likewise, this allows for placing a charge on the proppant to enhance and vary its characteristics in order to mix with frac fluids, easily flow and then remain in fissures created from fracturing the well.

Hurricanes, Tornadoes and Fire Whirls

It is well known and well understood that tornadoes, hurricanes and fire whirls are all forms of rotational energy or angular momentum that are not formed nor confined within or by a physical wall or reactor. The amount of energy within a hurricane or tornado is beyond imagination and is extremely difficult to calculate, simulate and model even with modern day computers.

Heretofore, studying plasma rotation has always been limited to the constraints of peaking into or placing sensors within a vessel. The present invention as disclosed in FIG. 13 eliminates the vessel or barrier but confines the plasma in an open atmosphere due to inertial energy. This opens the door to studying and understanding rotating plasmas, thus allowing for the design and rapid introduction and commercialization of a tangentially fired Plasma Whirl® Reactor.

Referring to FIG. 13, the geometrically shaped reactor or wall 110, such as a square, is simply a frame with PFM 170 to attach the plasma torches 100 via a anode nozzle pivot assembly 180. This allows the plasma torch 100 to pivot back and forth as shown by a curved line 181. The plasma torches are physically linked together via tie rods 190. A linear actuator 200 is attached to the torch 100 or a tie rod 190 and moves in either direction as shown by a line 201. Once the torches 100 are lit, the plasma can be confined, rotated and densified by operating the linear actuator 200. Likewise one or more sensors 111, such as a thermometer, may be attached to the reactor wall 160 in order to measure the internal temperature of the PFM 170. The linear actuator would be controlled via a process logic controller (PLC) or a computer with the sensors 111 providing feedback into the PLC or computer.

In addition, the plasma torches may be aligned to determine a yaw angle 121. Next, the plasma torches are realigned to a new vector 122 to determine plasma rotation velocity, temperature on the PFM 170 and study how the plasma changes with regards to the plasma torch alignment. Of course the new vector 122 will change the intersection point 140 of the plasma plumes. The system, method and apparatus disclosed allows for studying, modeling and then designing and optimizing a Plasma Whirl® Reactor for treating various material ranging from waste electronics to drill cuttings to gasifying coal by converting a tangentially fired boiler into a tangentially fired Plasma Whirl® Reactor.

The present invention provides a plasma reactor module that includes: three or more plasma sources each affixed to a reactor module via a pivot and aligned along a horizontal axis and said plasma torches are tied together via tie rods and a means for moving the tie rods via a PLC or computer with a feedback loop such that the plasma sources move in unison to change the characteristics of the rotating plasma.

To truly simulate a fire whirl and study plasma rotation the reactor wall or vessel 110 may be eliminated by coupling the plasma torch 100 to a robot 300 as shown in FIG. 14. For example, an ESAB PT-19 transferred arc plasma torch 100 with a water cooled anode nozzle (for transferring the arc) manufactured by Foret Plasma Labs, LLC is coupled to a robot 300. The robot arms are first placed in Position A. Next, the robot's arm is moved to position the torch 100 to Position B. It will be understood that each torch 100 will be attached to a robot 300 and aligned substantially along a horizontal plane with respect to its vertical axis 160. Three, four, five, six or more Robot Torches 300 may be attached to a skid or frame in order to be moved as a single unit. This also lends itself to a unique system, method and apparatus for cutting pipe, plasma welding, plasma spray coating or hard facing pipe.

The torches 100 may be continuously adjusted and realigned in real time with the robots in order to study the plasma as shown by Position A and B and their corresponding Yaw Angles A and B. This information can be compared and contrasted to the torches firing at right angles to one another to form a square or rectangle or configured to form various four angled shapes such as a parallelogram and/or rhombus to determine the best mode for processing different material. Likewise, this configuration as well as the tie rod configuration shown in FIG. 13, allows for stopping and reversing and increasing the speed of the rotation of the plasma by simply adjusting the alignment of the torches 100.

The present invention provides a method for studying rotating plasma that includes: three or more plasma sources each affixed to a robot and aligned along a horizontal axis such that the robots are maneuvered via a process logic controller with a feedback loop in order to change the characteristics of the plasma.

T-Fired Boiler Retrofit for Conversion to T-Fired Plasma Whirl® Reactor

The system, method and apparatus as disclosed in FIGS. 13 and 14 are important steps for modeling rotating plasma in order to retrofit existing T-Fired boilers with plasma torches 100 as shown in FIG. 15. Turning now to FIG. 15, a T-Fired boiler is retrofitted with Recuperative Inductively Coupled Plasma ArcWhirl Torches 100. This allows for retrofitting and converting a T-Fired Boiler into a gasifier or oxycombustion reactor.

Referring now to FIG. 16 a Linear Recuperator ICP ArcWhirl® Module is disclosed for constructing a Plasma Whirl® Reactor or converting a T-Fired Boiler into a T-Fired Plasma Whirl® Gasifier. It is well known and well understood that T-Fired burners are stacked and installed one on top of another to form a long vertical assembly. Likewise, the Recuperator ICP ArcWhirl® Module is a long vertically stacked group of plasma torches with a recuperator. It will be understood that the recuperator may house the entire plasma torch or just the torch eductor/ejector as shown in FIG. 16. A fluid such as water, steam, oxygen or air enters and exits the recuperator tube via an Inlet/Outlet in order to cool both the torch and PFM. The Inlets/Outlets are also the Pivot Points for the plasma tubes. Three or more recuperator tubes or aligned tangentially in accordance with the torches shown in FIGS. 11, 12, 13, 14 and 15 in order to form a rotating or whirling plasma. A fuel or waste material such as coal, petroleum coke, heavy oil, natural gas, drilling waste or woodchips may be fed directly into the plasma plume and then educted and entrained into the peripheral jet eductor utilizing steam, air, oxygen or even water as the motive fluid.

The pivoting Linear Stacked Plasma Torches allows for adjustment of the angle and alignment of the module during and after installation in T-Fired Boilers. Likewise, the tubes may be integrally connected via tie rods or each may have its own actuator in order to rotate the tube as shown by the Pivot Arrow in the Plan View of FIG. 16. It will be understood that these Plasma Tube Modules may be located in the four corners of a heat treating furnace, such as those used in foundries for heat treating purposes. Or located horizontally along the walls, roof and floor to create a horizontally rotating plasma.

The present invention provides a plasma module that includes: three or more plasma tubulars pivotely affixed to a structure; one or more plasma sources each partly disposed within the said tubulars, wherein the tubular has a cooling fluid inlet and an outlet pivotely attached to a structure; a means to pivot the tubular utilizing a PLC with a feedback loop to change and/or modify the characteristics of the plasma; and a means for starting, stopping and reversing the rotation of the plasma.

Likewise, three or more Plasma Tube Modules may be laid on their respective sides and positioned horizontally and tangential towards one another, for example to heat the outside barrel of a rotary kiln. Or the Plasma Tube Modules may be located within a heat recovery steam generator (HRSG) in order to boost the Btu content of the flue gas from a gas turbine engine, thermal oxidizer, furnace or boiler.

In addition, the linear plasma tubes may be used to replace the single torch in the R&D free standing model as shown in FIG. 13. This configuration would be used to design a free standing Plasma Whirl® Reactor as shown in FIG. 17.

Referring to FIG. 17, a Plasma Whirl® Reactor is disclosed in which the torch or a part thereof is housed within an annulus 171 formed between the outside reactor wall 170 and the PFM 170 wall. This configuration is one embodiment of a Plasma Whirl® Reactor module which can be sandwiched between a top and bottom plate with material inlets and outlets (not shown), the midsection of a reactor column, the body of a plasma melting furnace or as a section of a plasma gasifier.

In the event a recuperator vessel is not necessary, then a simple module can built using off-the-shelf plasma torches. Now referring to FIGS. 18, 19 and 20 a Sextant Plasma Whirl® Module (PWM) is disclosed utilizing six ESAB PT-19 torches with ESAB power supplies. FIG. 19 discloses various torch angles that can be determined by constructing a six torch R&D model with pivots or robots in lieu of the four torch R&D model disclosed in FIGS. 13 and 14A.

The pancake shaped PWM as disclosed in FIG. 21 may be designed to have a low profile thickness thus enabling it to be installed in existing equipment. A sextant plasma module includes: six plasma sources tangentially aligned within a reactor; and the reactor having a first wall and a plasma facing material. The following examples will demonstrate the some non-limiting uses of this design.

The diameter and thickness of each PWM is closely related to the power rating of the plasma torch. For example, an ESAB PT-19 torch connected to an ESAB ESP150 power supply is rated at 35 KW. Thus, a six torch PWM may have a diameter ranging from 24 inches to 48 inches. Two ESAB ESP 150's can be wired in series in order to double the amperage into the torch. Consequently, one size reactor will not fit all applications. Hence, that is the major reason for constructing a four or six torch R&D Robot module as disclosed in FIG. 14. Simply put, it eliminates guess work when calculating and designing a reactor for various federates and, various materials ranging from waste such as drill cuttings to virgin material such as proppants.

The Pancake style PWM configuration is unique in that the modules can be stacked as shown in FIG. 22. This allows for construction of a long vertical reactor, thus enhancing residence time as well as power rating.

A great for the PWM is coupling it to the present inventor's Carbon ArcWhirl® Cyclone which is disclosed in U.S. Pat. Nos. 7,422,695 and 7,578,937 both entitled, "Treatment of Fluids with Wave Energy from a Carbon Arc" and are hereby incorporated into the present invention in their entirety.

Confining Dense Plasma with the Plasma Arcwhirl®

Referring to FIG. 23, one or more PWMs as shown in FIG. 21, are installed within the cylindrical middle portion 400 of the ArcWhirl®, for example between a Top Portion Volute 500 and a Bottom Portion Cone, Reducer or Funnel 600. It is this configuration that allows for creating, sustaining and confining a very DENSE plasma. The function and best mode of the ArcWhirl® are fully disclosed in the '695 and '937 patents. However, to be brief, the carbon electrodes are electrically connected to a DC power supply. One carbon rod is the cathode and the other is the anode. One or both of the carbon rods are moved along the Longitudinal Axis in order to touch the other electrode thus forming a dead short. When the rod is pulled back or away from the other rod an Electrical Arc is formed between the rods or electrodes. The word carbon as defined herein also includes graphite, activated carbon or any form of carbon material that is electrically conductive.

When a fluid is flowed into the ArcWhirl® via Dual Inlets 501 and 502, any gases approaching the Electrical Arc are ionized and or thus considered to be in the fourth state of matter—Plasma. Now when the plasma torches 100 of the PWM are energized the plasma volume is increased substantially but also is confined and squeezed around the central Electrical Arc.

Many engineers and scientists claim that the plasma exiting from a plasma torch is greater than 15,000° C. However, this statement is not accurate with respect to modern day plasma cutting torches. The blue arc, which is the flow of electrons, when viewed through a welding shield is the part of the plasma that is at a very high temperature. The remaining ionized gases or plasma drop in temperature as it extends radially away from the Electrical Arc.

The Plasma ArcWhirl® Reactor as disclosed in FIG. 23 opens the door to processing and/or treating many materials that are difficult to treat with conventional thermal systems. Drill cuttings and biosolids are both extremely difficult to process due to conveying problems as well as high moisture or high fluid content.

Halliburton has developed and patented a unique hopper and conveying system referred to as the Honey Comb Base™ (HCB) Tank and the SupaVac™. Both systems are disclosed in U.S. Patent Application Publication No. 20090010719. Referring to FIG. 2b of Morris's '719 patent application, the HCB™ Tank has 6 downcomers in which 3 feed into a conveying conduit and the other 3 feed into a second conduit.

One configuration would be for the HCB™ Tank coupled via two conveying hoses or conduits to the dual inlets 501 and 502 of Plasma ArcWhirl® as disclosed in FIG. 23 of the present invention. The purpose for two or more inlets into any cyclone apparatus is to stabilize the core or vortex and also create a smooth umbrella type discharge of material from the underflow exit 601. In a single entry cyclone material tends to whip out of the underflow in a direction opposite of the inlet due to a pressure differential. As the material enters the ArcWhirl®, the dense solid material tends to go the outside walls and must pass directly through the plasma plume exiting from the plasma torches 100. The solids or dense material may exit via an underflow exit 601, while the less dense gases and particulate matter exits via a vortex finder 503 and through an overflow exit 504. In this configuration, as the carbon rods heat up an annulus 505 between the carbon rod and the vortex finder 503 will be at a sufficient temperature to treat any gases exiting the reactor via overflow exit 504.

Furthermore, a plasma can be physically blown out of the exit 504 and thermally oxidized by adding combustion air. This would allow for operating the Plasma ArcWhirl® as a combined gasifier and hot gas cleanup system, provided the conveying gas is an inert gas such as steam, while allowing the plasma plume to enter into a combustion section (not shown) that can be coupled directly to the top of the Plasma ArcWhirl®.

The present invention provides a reactor that includes: a vessel having a vertical longitudinal axis, a cylindrical middle portion 400 aligned with said vertical longitudinal axis, a top portion 500 and a bottom portion 600; three or more plasma sources mounted tangentially in said cylindrical middle portion 400 such that said plasma touches are substantially aligned with one another in a horizontal plane with respect to the vertical longitudinal axis and said plasma from said plasma sources combine together to create sufficient angular momentum to form a plasma vortex that circulates around an electrical arc within said vessel and is self-confining; one or more inlets 501 and 502 are disposed in said top portion 500 that are sized and aligned to direct a waste material into said plasma vortex; and an outlet 504 or 601 aligned with said vertical longitudinal axis and disposed in either said top portion 500 or said bottom portion 600.

Coupling a Plasma Whirl® Module to a HCB™ Tank

Referring to FIG. 24, one or more PWMs as shown in FIG. 21, are installed and located underneath the HCB™ Tank. The top 500 of PWM disclosed in FIG. 24 shows six inlets 501, 502, and an exit 504.

Referring to FIG. 2F of Morris's '719 patent application and Halliburton's brochure #H06475, date September 08, Figures HAL 17659, 17660 and 17661, the HCB™ Tank has six outlets. Thus, each outlet would be aligned to feed directly into the plasma plume of one of the six torches located in the PWM which is located on the bottom of the HCB™ Tank.

Now turning to FIG. 4 of U.S. patent application Ser. No. 10/196,466, two inlets 104 are disclosed with a central outlet 110. This apparatus also discloses RF coils 105. The present invention is similar to the original Plasma Whirl® Reactor design but does not include the RF coils. Piping the exit 504 of FIG. 24 back through the hopper feeding the Plasma Whirl® Module is new. This allows for preheating and pretreating the feed material, such as drill cuttings or biosolids to drive off moisture, hydrocarbons, VOCs, etc. This is different than the hopper 108 disclosed in FIGS. 5 and 11 of the Plasma Whirl Reactor® in U.S. patent application Ser. No. 10/196,466.

Again referring to Morris's '719 patent application FIGS. 2E and 2F, the HCB™ Tank's centrally located hexagonal cross section cone 40 may be retrofitted with a vortex finder pipe, herein after referred to as a riser. The riser is attached to exit 504 of the top 500 of the PCM shown in FIG. 24 of the present invention which then penetrates the centrally located hexagonal cross section cone 40 of Morris's FIG. 2E and then exits the HCB™ tank.

It will be understood that the PWM may have a bottom exit or outlet such as a cone in order for slag or solids to exit from the bottom while hot gases exit the top as disclosed in FIG. 23 of the present invention. The material can be fed into said one or more inlets 501 using a hopper and at least one exit 504 of the reactor is piped back into the hopper in order to pretreat the material within the hopper.

Using a Plasma Whirl® Module to Cut, Weld or Plasma Coat Pipe

Referring to FIG. 25, a PWM can be manufactured in a clam shell configuration with hinges in order to wrap around a pipe. This configuration allows for rapid preheating, cutting or beveling of a pipe, such as during the construction of a pipeline. Likewise, plasma welding is well known to produce a superior weld. By wrapping the PWM around the pipe the PWM can be rotated in order to weld the pipe in a single pass. A filler metal can be added during the welding process in order to reduce pinholes.

Referring again to the R&D Robot Plasma Whirl Module as shown in FIG. 3A, in lieu of rotating the Module, the robots would be programmed to slowly maneuver the torches around the circumference of the pipe for plasma cutting, welding, gouging or coating (with a plasma spray process).

Using a Plasma Whirl® Module to Preheat Charge Metal to a Furnace

Referring to FIG. 26, a PWM is shown above an induction furnace. This configuration allows for rapid preheating of the charge metal. In addition, since it well known that a plasma can be coupled to a radio frequency, this allows for the conversion of a standard Induction Furnace into a PlasmaWhirl® Induction Furnace. This configuration not allows for melting metal but also for treating waste material as well as virgin material.

The PWM of FIG. 24 would be attached to an induction furnace. Once again it would be fed with a unique hopper. The feed material may be selected from metal, drill cuttings, coke, coal, soil or any other material that must be treated to extremely high temperatures. The gases would exit back up and out through the hopper via a riser while the molten metal, glass or slag would exit either a bottom or side exit.

Each plasma source can be an AC plasma torch, DC plasma torch, a microwave plasma torch, an inductively coupled plasma torch or a combination thereof. The interior of the vessel can be pancake-shaped, cylindrically-shaped or shaped like a cyclone separator. The vessel will typically have a top outlet disposed in the top portion and a bottom outlet disposed in the bottom or the side portion of the vessel. The bottom portion can be cone shaped or substantially flat. A set of radio frequency generating coils may be disposed around an exterior of the circular middle portion, or the circular middle portion and at least a portion of the bottom portion. The material can be a gas, a fluid, a semi-solid, a solid or a combination thereof.

Attaching a Plasma Whirl® Module to a Rotary Kiln

Referring to FIG. 27, a PWM is shown attached to a rotary kiln. It will be understood that the horizontal plane and vertical axis as disclosed to describe the invention do change with respect to their meaning regardless of the physical orientation the PWM. In otherwords, when the PWM is flipped on its side as shown in FIG. 27, a rotating plasma will still be formed within the confines of the PWM. This configuration allows for preheating, postheating or a combination of both for existing rotary kilns.

Attaching a Plasma Whirl® Module to a Cyclone Separator

Referring to FIG. 28, a PWM is shown attached to the underflow of a cyclone separator. This configuration allows for rapid treating of the material exiting from the underflow. The underflow or overflow of any cyclone or hydrocyclone can be retrofitted with a PWM in order to treat the material exiting from either the underflow or overflow. The ideal PWM to attach to either the underflow or overflow of a cyclone would have a top or bottom central inlet. Conversely the exit would be either the top, bottom or side if an RF Induction furnace is used. Quite simply a cyclone separator underflow could be discharge into the configuration previously disclosed in Example 5.

Attaching a Plasma Whirl® Module to a Gas Turbine Exhaust for Treating Low BTU Gas Referring to FIG. 29, a PWM is shown attached to the exhaust of a gas turbine engine. This configuration could be applied to aviation turbines as a unique augmentor or land based gas turbines in order to post heat the exhaust. This would allow for heat recovery in a heat recovery steam generator. Quite simply a low BTU gas such as biogas from landfills or digesters or associated gas from oil and gas wells or flare gas from refineries, petrochem and chemical facilities is fired directly in the plasma torches and converted or cracked into hydrogen and carbon or hydrogen and carbon monoxide (Syngas). Since it is well known that turbines produce excess air, the additional oxygen within the exhaust is used to combust the syngas, thus allowing for recovery of energy in the form of steam or via a power turbine.

Retrofitting a Tokamak Reactor with PWMs

Referring to FIG. 30, one or more PWMs are attached to a Tokamak Fusion Reactor. This configuration when using electron beams as the plasma source for the PWMs allows for generating very dense plasma within the central core of the Tokamak. Superconducting magnets would squeeze the electron beams towards one another. As previously disclosed a positively charged particle could be injected into the reactor to create and sustain a fusion reaction. By using the pivoting PWM the plasma rotation can be started, stopped and reversed as necessary to sustain the reaction.

Not being bound by theory, it is believed that the electron beams could be aligned to rotate the plasma with an axial or linear motion. In the instant the anion is charged to the center of the rotation, the electron beams would be aligned to fire directly into the center to superheat the anion material and create a fusion reaction. By synchronizing the superconducting magnets to go to full power at the instant the electron beams are steered toward dead center, it is believed that a fusion reaction may be sustained with the proper anion. It is well understood that electron beams can be steered and confined with magnets, thus the pivoting electron beam gun may not be necessary in order to work properly in this configuration.

Finally, the purpose for constructing a R&D model as disclosed in FIGS. 3 and 3A is to gather data to determine the feasibility of this approach for future plasma fusion reactor designs.

Sintering Proppants

Referring to FIG. 31, a four torch Plasma Whirl® Reactor is shown. Each torch can be a microwave torch, an inductively coupled torch, a DC carbon ArcWhirl® torch, a Plasma Whirl® torch, an AC plasma torch or other suitable torch. The four torch Plasma Whirl® Reactor can be used to sinter proppants. Other devices as described herein can also be used to sinter proppants. Additional devices and the process for sintering proppants are described in U.S. Patent Application Serial Nos. 61/735,996 and 61/777,999, both of which are hereby incorporated by reference in their entirety.

Electrode Boiler

Referring to FIG. 32 a three torch AC DC Arc Whirl® Reactor System is shown. This embodiment provides an electrode boiler that can operate in any desired configuration—AC Delta, AC WYE or DC.

The foregoing description of the apparatus and methods of the invention in preferred and alternative embodiments and variations, and the foregoing examples of processes for which the invention may be beneficially used, are intended to be illustrative and not for purpose of limitation. The invention is susceptible to still further variations and alternative embodiments within the full scope of the invention, recited in the following claims.

What is claimed is:

1. A plasma system comprising:
a plasma arc torch comprising:
a cylindrical vessel having a first end and a second end,
a first tangential inlet/outlet connected to or proximate to the first end,
a second tangential inlet/outlet connected to or proximate to the second end,
an electrode housing connected to the first end of the cylindrical vessel such that a first electrode is (a) aligned with a longitudinal axis of the cylindrical vessel, and (b) extends into the cylindrical vessel, and
a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel;
a cylindrical tube attached to the hollow electrode nozzle and aligned with the longitudinal axis, the cylindrical tube having a side inlet and a radio frequency coil disposed around or embedded within the cylindrical tube; and
an eductor attached to the cylindrical tube and aligned with the longitudinal axis.

2. The plasma system as recited in claim 1, further comprising induced gas floatation cell attached to the eductor.

3. A plasma system comprising:
three or more plasma arc torch modules aligned with one another to form a confined plasma whirl; and
each plasma arc torch module comprising:
a plasma arc torch comprising:
a cylindrical vessel having a first end and a second end,
a first tangential inlet/outlet connected to or proximate to the first end,
a second tangential inlet/outlet connected to or proximate to the second end,
an electrode housing connected to the first end of the cylindrical vessel such that a first electrode is (a) aligned with a longitudinal axis of the cylindrical vessel, and (b) extends into the cylindrical vessel, and
a hollow electrode nozzle connected to the second end of the cylindrical vessel such that a centerline of the hollow electrode nozzle is aligned with the longitudinal axis of the cylindrical vessel, the hollow electrode nozzle having a first end disposed within the cylindrical vessel and a second end disposed outside the cylindrical vessel;
a cylindrical tube attached to the hollow electrode nozzle and aligned with the longitudinal axis, the cylindrical tube having a side inlet and a radio frequency coil disposed around or embedded within the cylindrical tube; and
an eductor attached to the cylindrical tube and aligned with the longitudinal axis.

4. The plasma system as recited in claim 3, further comprising a robotic mount attached to each plasma arc torch module.

5. The plasma system as recited in claim 3, further comprising an electrode disposed within the confined plasma.

6. The plasma system as recited in claim 3, further comprising:
a vessel; and
wherein each plasma arc torch module are aligned with the vessel such that the confined plasma whirl is approximately centered within a longitudinal axis of the vessel.

7. The plasma system as recited in claim 6, wherein the vessel comprises a plasma module.

8. The plasma system as recited in claim 7, further comprising one or more additional modules that are aligned with the longitudinal axis of the plasma module.

9. The plasma system as recited in claim 7, wherein the plasma module comprises a plasma pipe cutter, preheater or fusion welder.

10. The plasma system as recited in claim 7, further comprising a radio frequency induction furnace attached to the plasma module.

11. The plasma system as recited in claim 7, further comprising:
the plasma module comprises a first plasma module;
a second plasma module; and
a rotary kiln disposed between the first and second plasma modules.

12. The plasma system as recited in claim 7, wherein the plasma module is integrated into a gas turbine.

* * * * *